United States Patent
Wragg et al.

(10) Patent No.: US 12,395,377 B2
(45) Date of Patent: Aug. 19, 2025

(54) TRAFFIC LOAD BALANCING BETWEEN A PLURALITY OF POINTS OF PRESENCE OF A CLOUD COMPUTING INFRASTRUCTURE

(71) Applicant: CLOUDFLARE, INC., San Francisco, CA (US)

(72) Inventors: David Paul Wragg, London (GB); Ólafur GuÐmundsson, Chevy Chase, MD (US); Lorenz Mathias Bauer, London (GB); Arthur Fabre, London (GB); Marek Przemyslaw Majkowski, Warsaw (PL)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 18/516,543

(22) Filed: Nov. 21, 2023

(65) Prior Publication Data
US 2024/0089315 A1 Mar. 14, 2024

Related U.S. Application Data

(63) Continuation of application No. 17/481,181, filed on Sep. 21, 2021, now Pat. No. 11,824,923, which is a
(Continued)

(51) Int. Cl.
*H04L 67/1008* (2022.01)
*H04L 45/00* (2022.01)
(Continued)

(52) U.S. Cl.
CPC .......... *H04L 67/1008* (2013.01); *H04L 45/22* (2013.01); *H04L 47/122* (2013.01); *H04L 67/1001* (2022.05)

(58) Field of Classification Search
CPC ....... H04L 47/10; H04L 47/12; H04L 47/122; H04L 47/125; H04L 47/76; H04L 45/22
See application file for complete search history.

(56) References Cited

U.S. PATENT DOCUMENTS

| 7,369,557 B1 | 5/2008 | Sinha |
| 8,843,998 B2 | 9/2014 | Fu et al. |

(Continued)

OTHER PUBLICATIONS

Eisenbud et al., "Maglev: A Fast and Reliable Software Network Load Balancer", 13th USENIX Symposium on Networked Systems Design and Implementation (NSDI '16), Available Online at <https://www.usenix.org/system/files/conference/nsdi16/nsdi16-paper-eisenbud.pdf>, Mar. 16-18, 2016, pp. 523-535.

(Continued)

*Primary Examiner* — Boris D Grijalva Lobos
(74) *Attorney, Agent, or Firm* — NICHOLSON DE VOS & ELLIOTT LLP

(57) ABSTRACT

Methods and system of traffic load balancing between a plurality of Points of Presence (PoP) of a cloud computing infrastructure are described. A first PoP of multiple PoPs of cloud computing infrastructure that provides a cloud computing service receives a packet. The packet includes as a destination address an anycast address advertised by the first PoP for reaching the cloud computing service. The first PoP identifies a network address of a second PoP that is different from the first PoP. The first PoP forwards the packets as an encapsulated packet to the second PoP to be processed in the second PoP according to the cloud computing service.

21 Claims, 10 Drawing Sheets

Related U.S. Application Data continuation of application No. 17/023,209, filed on Sep. 16, 2020, now Pat. No. 11,128,695.

(51) Int. Cl.
*H04L 47/122* (2022.01)
*H04L 67/1001* (2022.01)

(56) References Cited

U.S. PATENT DOCUMENTS

| | | | |
|---|---|---|---|
| 9,379,981 | B1 | 6/2016 | Zhou et al. |
| 9,467,378 | B1 | 10/2016 | Stark et al. |
| 9,584,328 | B1 | 2/2017 | Graham-Cumming |
| 9,680,951 | B1 * | 6/2017 | Graham-Cumming ............... H04L 45/566 |
| 10,567,333 | B2 | 2/2020 | Sawyer et al. |
| 10,931,743 | B1 | 2/2021 | Chou et al. |
| 11,621,891 | B1 | 4/2023 | Chou et al. |
| 2003/0198189 | A1 | 10/2003 | Roberts et al. |
| 2014/0122698 | A1 * | 5/2014 | Batrouni ............ H04L 41/0896 709/224 |
| 2015/0215388 | A1 | 7/2015 | Kontothanassis et al. |
| 2017/0366604 | A1 | 12/2017 | McDuff |
| 2018/0006952 | A1 | 1/2018 | Nakakura et al. |
| 2018/0367498 | A1 * | 12/2018 | Bliss ............... H04L 45/74 |
| 2019/0208554 | A1 | 7/2019 | Ruiz et al. |
| 2020/0213154 | A1 | 7/2020 | Han et al. |

OTHER PUBLICATIONS

Github, "Glb-Director", Available Online at <https://github.com/github/glb-director/tree/master/src/glb-redirect>, Jan. 2020, 1 page.

Herbert et al., "Generic UDP Encapsulation: Draft-ietf-intarea-gue-09", Internet Draft, Available online at <https://datatracker.ietf.org/doc/draft-ietf-intarea-gue/?include_text=1>, Oct. 26, 2019, 24 pages.

Non-Final Office Action, U.S. Appl. No. 17/481,181, Jan. 6, 2023, 18 pages.

Notice of Allowance, U.S. Appl. No. 17/023,209, May 19, 2021, 9 pages.

Notice of Allowance, U.S. Appl. No. 17/481,181, Jul. 19, 2023, 10 pages.

Olteanu et al., "Stateless Datacenter Load-balancing with Beamer", 15th USENIX Symposium on Networked Systems Design and Implementation, Available Online at <https://www.usenix.org/system/files/conference/nsdi18/nsdi18-olteanu.pdf>, Apr. 9-11, 2018, pp. 125-139.

Olteanu et al., "Stateless Datacenter Load-balancing with Beamer", Available Online at <https://www.usenix.org/conference/nsdi18/presentation/olteanu>, 2018, 40 slides.

Shirokov et al., "Open-sourcing Katran, a Scalable Network Load Balancer", Open Source, Available Online at <https://engineering.fb.com/open-source/open-sourcing-katran-a-scalable-network-load-balancer/>, May 22, 2018, 7 pages.

Unknown author, "What is tunneling or port forwarding", Definition from TechTarget (Year: 2007).

Yong et al., "GRE-in-UDP Encapsulation", RFC: 8086, Internet Engineering Task Force (IETF), Mar. 2017, pp. 1-27.

* cited by examiner

FIG. 1D

Time t2

INTER-POP FORWARDING POLICIES 142A

| AMOUNT OF TRAFFIC TO FORWARD 144A | DESTINATION ADDRESS 145A |
|---|---|
| 10% | ADDRESS OF POP 150B (e.g., EXTERNAL IP ADDRESS OF COMPUTE SERVER 120B) — 146A |
| 10% | ADDRESS OF POP 150C — 147A |
| 0% TIER ONE | ADDRESS OF POP 150B — 148A |
| 10% TIER TWO | ADDRESS OF POP 150B — 149A |

Time t1

INTER-POP FORWARDING POLICIES 142A

| AMOUNT OF TRAFFIC TO FORWARD 144A | DESTINATION ADDRESS 145A |
|---|---|
| 5% | ADDRESS OF POP 150B (e.g., EXTERNAL IP ADDRESS OF COMPUTE SERVER 120B) — 146A |
| 10% | COMPUTE SERVER IN POP 150C — 147A |
| 2% TIER ONE | ADDRESS OF POP 150B — 148A |
| 5% TIER TWO | ADDRESS OF POP 150B — 149A |

TRAFFIC LOAD BALANCING BETWEEN A PLURALITY OF POINTS OF PRESENCE OF A CLOUD COMPUTING INFRASTRUCTURE

CROSS-REFERENCE TO RELATED APPLICATIONS

This application is a continuation of Ser. No. 17/481,181, filed Sep. 21, 2021, which is a continuation of U.S. application Ser. No. 17/023,209, filed Sep. 16, 2020, now U.S. Pat. No. 11,128,695, which is hereby incorporated by reference.

TECHNICAL FIELD

One or more embodiments relate to the field of network computing; and more specifically, to traffic load balancing between a plurality of Points of Presence of a cloud computing infrastructure.

BACKGROUND ART

Today there is a proliferation of cloud-based services that provide services to users located around the world. To meet a high demand for these services at low latency, a cloud-based service hosts the service on a number of servers located in multiple locations around the world. These locations are referred to as clusters or Points of Presence (PoPs). A PoP includes hardware and software resources for providing a service in a geographical area. A PoP can be part of a data center. The data center can be owned by the service provider or by a third-party providing hardware resources as a service (Infrastructure as a Service) to the service provider.

To ensure the efficient use of the resources within each PoP, a load balancer receives the traffic and distributes the traffic load evenly across the servers of the PoP so that no single server gets overloaded. Thus, a PoP's load balancer steers traffic destined to a given service across a dynamic set of servers. These servers are sometimes referred to as backend servers.

Several solutions for enabling load balancing of traffic within a PoP exist. However, with the increase in that volume of traffic load balancing this traffic within the PoP may not be sufficient as the backend servers may still get overloaded. Additional computing resources may be needed to support this increase in traffic.

BRIEF DESCRIPTION OF THE DRAWINGS

The following figures use like reference numbers to refer to like elements. Although the following figures depict various exemplary embodiments, alternative embodiments are within the spirit and scope of the appended claims. In the drawings:

FIG. 1C illustrates a block diagram of exemplary inter-PoP forwarding policies that can be configured for a first PoP at a first time, in accordance with some embodiments.

FIG. 1D illustrates a block diagram of exemplary inter-PoP forwarding policies that can be configured for a first PoP at a second time, in accordance with some embodiments.

DETAILED DESCRIPTION

Figure 1A:
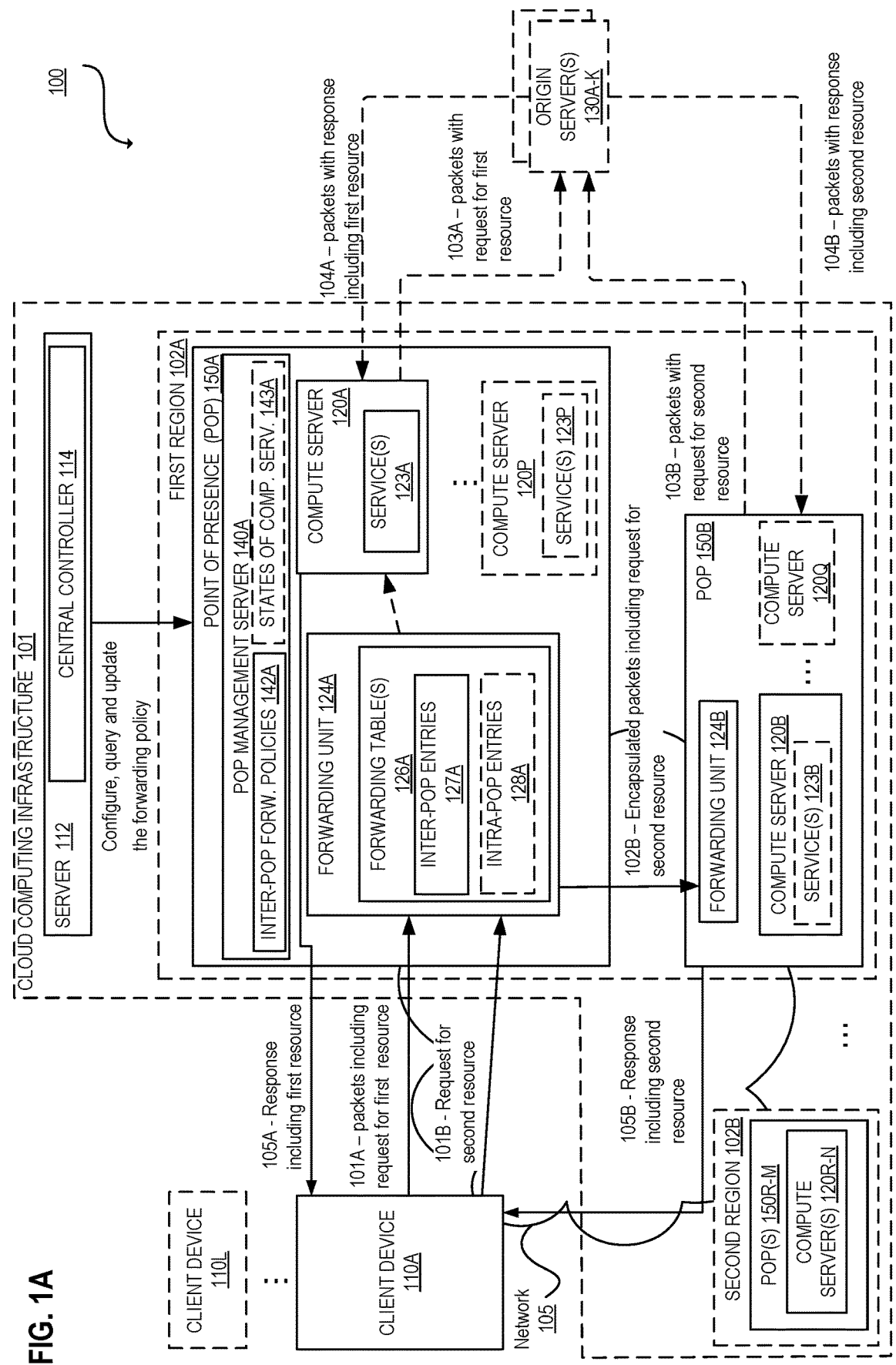
FIG. 1A illustrates a block diagram of a system including a cloud computing infrastructure in accordance with some embodiments.

The following description describes methods and apparatus for traffic load balancing between a plurality of Points of Presence of a cloud computing infrastructure. In the below description, numerous specific details such as resource partitioning/sharing/duplication embodiments, types and interrelationships of system components, and logic partitioning/integration choices are set forth in order to provide a more thorough understanding. It will be appreciated, however, by one skilled in the art, that the invention may be practiced without such specific details. In other instances, control structures, logic embodiments, opcodes, means to specify operands, and full software instruction sequences have not been shown in detail since those of ordinary skill in the art, with the included descriptions, will be able to implement what is described without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations and/or structures that add additional features to some embodiments. However, such notation should not be taken to mean that these are the only options or optional operations, and/or that blocks with solid borders are not optional in certain embodiments.

In the following description and claims, the term "coupled," along with its derivatives, may be used. "Coupled" is used to indicate that two or more elements, which may or may not be in direct physical or electrical contact with each other, co-operate or interact with each other.

Existing Load Balancing Techniques in Cloud Infrastructure

Cloud computing infrastructures can provide services to users through a network computing infrastructure that is distributed across multiple geographical areas. A PoP of a cloud computing infrastructure includes one or more compute servers located at a same geographical area and host the service(s) provided to the users of the cloud computing infrastructure. To address the increase in traffic handled by PoPs of the cloud computing infrastructure and CPU load on these PoPs, the cloud computing infrastructure can increase its capacity by adding hardware (e.g., adding compute servers in existing PoPs, or adding PoPs in a geographical region). However, predicting the future CPU needs of a PoP is challenging, and the lead time for upgrading the hardware and deploying the service in a PoP is long. A solution to addressing the increase of network traffic is to regulate the CPU load across the PoPs of the cloud computing infrastructure. One mechanism of doing so is the load balancing of the CPU load between the existing PoPs of the cloud computing infrastructures. Some solutions exist for load balancing by managing the network traffic arriving at a PoP. One such solution relies on a routing and reachability protocol, e.g., Border Gateway Protocol (BGP). For example, in an anycast routing based cloud computing infrastructure, where the traffic that reaches a compute server of a PoP is determined by the anycast Internet Protocol addresses that the compute server advertises to the network through BGP, one solution of load balancing across PoPs is based on withdrawing some of the advertised IP addresses from compute servers of a PoP. The withdrawal of these IP addresses reduces the traffic reaching the compute servers of the PoP (as these servers will no longer receive traffic destined to the withdrawn IP addresses), and consequently reduces the compute processing (CPU) load on the PoP. However, this BGP-based approach has several drawbacks. The solution works at the granularity of the anycast IP addresses that are advertised from the PoPs. Therefore, changes to the cloud computing infrastructure are not finegrained, and there are limits to the ability of the cloud computing infrastructure to predict the resulting impact of these changes on CPU load. Further, when a PoP withdraws or restores the advertisement for an IP address, long lived Transmission Control Protocol (TCP) connections (or User Datagram Protocol (UDP)-based pseudo-connections) destined for that IP address will be broken. Another consequence of withdrawal of the IP addresses is that traffic associated with a withdrawn IP address will go to some other PoPs instead. However, there is no control over which PoPs are to receive the traffic. The new PoP to receive the traffic destined to the IP address is determined based on the routing protocol (e.g., the anycast protocol). In addition, changes to the routing network in response to BGP advertisement take some time (e.g., a minute or two) to propagate across the network and to take full effect. Therefore, there is a need for a more efficient load-balancing mechanism between PoPs of a cloud computing infrastructure that provides more control over the re-routing of the traffic.

In one embodiment, a first PoP of a plurality of PoPs that form a cloud computing infrastructure receives a packet. The packet includes as a destination address an anycast address advertised by the first PoP for reaching a cloud computing service. In some embodiments, the first PoP may optionally determine whether the packet is a security threat. Upon determining that the packet is a security threat, the packet is dropped. Alternatively, upon determining that the packet is not a security threat, the first PoP identifies, based on a forwarding table entry and an identifier for a flow of the packet, a compute server that is part of a second PoP of the plurality of PoPs that is different from the first PoP. Upon identification of the compute server, the first PoP encapsulates the packets into an encapsulated packet that includes an external address of the compute server as the destination address of the packet. The first PoP transmits the encapsulated packet to the second compute server to be processed in the second PoP according to the cloud computing service. In this embodiment, while the packet is received at a first PoP based on an anycast address and the first PoP is the destination of the anycast address, the packet is forwarded to be processed to another PoP that is remote and different from the first PoP according to the forwarding table entry. This mechanism enables load balancing of traffic across multiple PoPs.

In another embodiment, the load balancing of traffic across multiple PoPs is further performed by avoiding disruption of existing connection(s) in the PoPs. In one embodiment, a first PoP receives a first packet that includes as a first destination address an anycast address advertised by the first PoP for reaching the cloud computing service. The first PoP identifies, based on a forwarding table entry and a first identifier for a first flow of the first packet, a first compute server that is local to the first PoP and a second compute server that is part of a second PoP of the plurality of PoPs that is different from the first PoP. In response to determining that a first connection is established at the first compute server for the first flow, the first packet is processed at the first compute server according to the cloud computing service. Alternatively, in response to determining that no connection is established at the first compute server for the first flow, the first PoP determines whether the first packet is an initial packet of a new connection for the first flow. When it is determined that the first packet is not the initial packet of the new connection, the first packet is transmitted to the second compute server that is part of the second PoP of the plurality of PoPs to be processed in the second PoP according to the cloud computing service.

In some embodiments, when it is determined that the first packet is the initial packet of a new connection, a determination of a forwarding direction is performed. When it is determined that the forwarding direction indicates a local forwarding, the first packet is processed at the first compute server of the first PoP; and when it is determined that the forwarding direction indicates a remote forwarding, the first packet is processed at the second compute server of the second PoP.

The embodiments described herein provide several advantages when compared to existing load balancing solutions. For example, in contrast to other solutions, such as BGP-based load balancing solutions, the embodiments herein maintain lingering connections. That is, changes made to the forwarding policy of a PoP will not break established connections while enabling new connections to obey the new forwarding policy. Further, the embodiments herein enable a more fine-grained and explicit control of forwarding policies from a PoP to another PoP. Thus, these embodiments offer predictable control of the destination of traffic and consequently more predictable control of resource usage in the cloud computing infrastructure. In some embodiments, encapsulation protocol(s) can be used to forward packets between PoPs. The use of encapsulation tunnels to redirect traffic from a PoP to another PoP enables a fine-grained control of the traffic forwarding. A PoP may forward parts of its incoming traffic to one or multiple other PoPs. For example, a forwarding policy can specify the percentage of traffic to be forwarded to each target PoP for a given type of traffic. The combination of fine-grained control and unobtrusive changes to forwarding policies allow the systems herein to make frequent changes to forwarding policies and forwarding table entries, which prevent PoPs from becoming overloaded.

FIG. 1A illustrates a block diagram of a system 100 including a cloud computing infrastructure, in accordance with some embodiments. The cloud computing infrastructure can provide different services to users. The cloud computing infrastructure can provide services such as protecting against internet-based threats, providing performance services for customers (e.g., acting as a content delivery network (CDN) and dynamically caching customer's files close to visitors, page acceleration, etc.), TCP stack optimizations, and/or other services. The system 100 includes the client devices 110A-L, the compute servers 120A-N included in different Points of Presence (PoPs) 150A-M, the server 112, and the optional origin servers 130A-K.

Each one of the client devices 110A-N is a computing device (e.g., laptop, workstation, smartphone, mobile phone, tablet, gaming system, set top box, wearable device, Internet of Things (IoT) device, etc.) that is capable of transmitting and/or receiving network traffic. Each client device may execute a client network application such as a web browser, native application, or other application that can access network resources (e.g., web pages, images, word processing documents, PDF files, movie files, music files, or other computer files). A client device, e.g., client device 110A, is operative to transmit requests for network resources through the network 105. The requests are transmitted in one or more packets (e.g., IP/TCP packets) 101A to a compute server, e.g., compute server 120A, of the cloud computing infrastructure 101. The client device 110A is operative to receive response(s) from a compute server of the cloud computing infrastructure 101. In some embodiments, the responses are received from another compute server, e.g., compute server 120B, that is different from the one to which the requests are transmitted. The embodiments described herein will use the client device 110A as an exemplary client device, however, one of ordinary skill in the art would understand that multiple client devices can transmit requests and receive responses to/from the PoPs of the cloud computing infrastructure 101. Typically, multiple client devices communicate with each one of the compute servers of a PoP of the cloud computing infrastructure 101.

The compute servers 120A-N are part of the cloud computing infrastructure. The compute servers 120A-N are physical electronic devices and can be geographically distributed (e.g., in different locations throughout the world). There may be hundreds of compute servers as part of the cloud computing infrastructure 101. The compute servers 120A-N may be part of PoPs 150A-M. Each one of the PoPs may include one or more of the compute servers. For example, PoP 150A includes the compute servers 120A-P, PoP 150B includes the compute servers 120B-Q, and PoPs 150R-M includes the compute servers 120R-N. Each one of the compute servers 120A-N may host a service that is offered by the cloud computing infrastructure 101 to customers or users. The compute servers 120A-N may also host services and/or functionalities that are used to support the service offered by the same or other compute servers in a PoP. For example, a compute server may implement control functionalities, DNS service (e.g., one or more authoritative name servers, one or more proxy DNS servers), a proxy service, a CDN service, TCP stack optimization, a caching service, etc. Each PoP may also include one or more other pieces of network equipment such as router(s), switch(es), hub(s), and/or other intermediate computing devices. Each PoP (and each compute server) may be part of a different data center and/or colocation site.

In some embodiments, the compute server 120A is operative to host the service(s) 123A of the cloud computing infrastructure 101. In these embodiments, upon receipt of a request for a service 123A, the compute server 120A is operative to process the received request at the network layer (Layers 3/4) and further operative to fulfill the request for service at the application layer (Layer 7).

In some embodiments, the PoP 150A includes a forwarding unit 124A. The forwarding unit 124A is operative to receive packets from one or more client devices and process the packets according to multiple embodiments described herein. In one embodiment, the forwarding unit 124A is operative to transmit the packet to a local compute server, e.g., compute server 120A included in PoP 150A, to be processed at the first PoP 150A. In this embodiment, a request for a service hosted by the cloud computing infrastructure is fulfilled at the first PoP 150A. In another embodiment, the forwarding unit 124A is operative to transmit the packet to a remote compute server of a second PoP that is different from the first PoP. For example, the forwarding unit 124A is operative to transmit the packet to the compute server 120B of PoP 150B. In some embodiments, the forwarding unit 124A may be operative to transmit all packets to a local compute server of the first PoP 150A and based on certain criteria the packet may be processed at the local compute server or alternatively forwarded to the second compute server of a second PoP 150B. In some embodiments, the forwarding unit 124A is implemented in a compute server of a PoP and is part of a local network of the PoP. In some embodiments, the forwarding unit 124A is operative to receive traffic that is destined to an anycast address (e.g., anycast Internet Protocol (IP) address) that is advertised by the PoP 150A. For example, the anycast address advertised by the PoP can be advertised through a BGP protocol implemented in a router that is part of the PoP 150A. In some embodiments, the forwarding unit 124A and the router can be implemented on the same network device. Alternatively, the forwarding unit 124A and the router can be implemented on separate network devices that are part of the same local network in the PoP 150A. In some embodiments, the anycast address can be associated with a network resource (e.g., a domain) that is hosted by an origin server.

The compute servers 120A-N can be geographically distributed across the multiple PoPs, which decreases the distance between requesting client devices and the compute servers and decreases the time necessary to respond to a request. In some embodiments, the compute servers 120A-N may operate as reverse proxies and may receive requests for network resources (e.g., HTTP requests) of a domain of an origin server 130A included in packets. The particular compute server that receives a request from a client device may be determined by the network infrastructure according to an anycast implementation or by a geographical load balancer. For instance, the compute server 120A, the compute server 120P, and the computer server 120N may have a same anycast address for a domain of the origin server 130A. If the origin server 130A handles the domain "example.com," a domain name service (DNS) request for "example.com" returns an address record having the anycast IP address of the compute server 120A, compute server 120P, and computer server 120N. Which one of the compute server 120A, compute server 120P, and compute server 120N receives a request from a client device depends on which compute server is closest to the client device in terms of routing protocol configuration (e.g., BGP configuration) according to an anycast implementation as determined by the network infrastructure (e.g., router(s), switch(es), and/or other network equipment between the requesting client and the compute servers 120A, 120P, and 120N. By way of example, the client device 110A is closest to the compute server 120A. Accordingly, requests from the client device 110A are received at the compute server 120A. While at a moment in time traffic from a client device transmitted to the cloud computing infrastructure is received at the first PoP for the anycast address, at another moment in time, the traffic from the same client device and for the same anycast address can be received at another PoP due to the anycast protocol. Further, traffic destined to the same anycast address that originates from different client devices may be routed to the same PoP of the cloud computing infrastructure or to different PoPs of the cloud computing infrastructure. The number of client devices and compute servers illustrated in FIG. 1A is exemplary. The distributed cloud computing network may include hundreds to thousands (or more) compute servers and each compute server may receive requests from thousands or more client devices.

In some embodiments, a compute server in a PoP is operative to send heartbeat packets to signal node liveness to the PoP management server 140A. The compute server is further operative to perform service health checks on the node on which it is implemented. The compute server is operative to process packets at the network layer and at the application layer for providing the cloud computing service.

Each one of the compute servers has an external IP address (sometimes referred to as a global IP address). In some embodiments, each one of the compute servers has an anycast IP address in addition to the external IP address. The anycast IP address is assigned to multiple compute servers located in different geographical regions and which are part of multiple PoPs of the cloud computing infrastructure. For example, the compute server 120A has a first external IP address that is unique to the computer server 120A and a first anycast IP address; the compute server 120B has a second external IP address that is unique to the compute server 120B and a second anycast IP address. In some embodiments, the compute server 120A and the compute server 120B have the same anycast IP address. In other embodiments, the compute server 120A and the compute server 120B have different anycast IP addresses.

Each one of the PoPs includes one or more PoP management servers 140A. A PoP management server is operative to track the state of the compute servers in the PoP, receive and store forwarding policies, manage and update forwarding tables of the compute servers based on the forwarding policies, manage a prefix list, and/or perform other networking related control operations. The PoP management server, e.g., PoP management server 140A, is operative to receive and respond to control commands from a central controller 114 of the cloud computing infrastructure 101. In some embodiments, the PoP management server 140A is operative to receive and respond to control commands that cause the configuration, update, and query of inter-PoP forwarding policies. As it will be described in further detail below, the forwarding policies enable the dynamic load balancing of traffic across multiple PoPs of the system 100.

The server 112 is operated by the cloud computing infrastructure 101 and provides a set of tools and interfaces for a customer to, among other things, configure code to run in the PoPs 150A-M of the cloud computing infrastructure 101. The server 112 includes a central controller 114. The central controller 114 is operative to configure, query, and update forwarding policies in the PoPs. In some embodiments, the central controller 114 has a global view of the cloud computing infrastructure that includes the multiple PoPs and is operative to configure and/or update forwarding policies within the PoP that cause traffic received at a first PoP to be forwarded to another PoP to be processed.

In an embodiment, the server 112 allows a customer to provision one or more services (e.g., malicious domain emulation service, API compatibility service, a proxy service, a CDN service, TCP stack optimization, a caching service, etc.) to the cloud computing infrastructure through DNS. For example, DNS record(s) of a customer are changed such that DNS records of hostnames point to an IP address of a compute server instead of the origin server. In some embodiments, the authoritative name server of the customer's domain is changed to an authoritative name server of the service and/or individual DNS records are changed to point to the compute server (or point to other domain(s) that point to a compute server of the service). For example, the customers may change their DNS records to point to a CNAME record that points to a compute server of the service. In one embodiment, customers may use the server 112 to change their authoritative name server to an authoritative name server of the cloud computing infrastructure and/or change their zone file records to have their domain point to the compute servers. Pointing the DNS or similar records to the compute server 120A enables the compute server to act as a proxy for requests directed to the origin server. In this manner, the requests for content items sent to the origin server and the responses thereto pass through the computer server and enable the one or more worker scripts to be executed. While some embodiments are described with the server 112 performing the provisioning of the services in addition to the control and configuration of the forwarding policies, in other embodiments, the provisioning of the services can be performed by another server that is separate from the server 112. While the embodiments herein will be described with respect to a proxy service provided by the cloud computing infrastructure 101, where a compute server of the cloud computing infrastructure is to receive a request for a network resource instead of an origin server that hosts the network resource, in other embodiments, the type of services that are offered by the cloud computing infrastructure can vary without departing from the scope of the embodiments described herein.

The origin servers 130A-K, which may be owned or operated directly or indirectly by customers of the cloud computing infrastructure 101, are computing devices on which a network resource resides, is generated, and/or otherwise originates (e.g., web pages, images, word processing documents, PDF files movie files, music files, or other content items). Although FIG. 1A illustrates the origin server 130A communicating with the compute server 120A, the origin server 130A may also communicate with one or more of the other compute servers 120. Similarly, while FIG. 1A illustrates a case with the PoP 150A servicing a single origin server 130A, the PoP 150A can service any number of origin servers.

The cloud computing infrastructure 101 enables load balancing of traffic across the multiple PoPs. In some embodiments, the receipt of a flow of traffic in a PoP of the cloud computing infrastructure 101 is performed based on an anycast protocol. The system of FIG. 1A enables the forwarding of requests from a PoP that receives the request according to the anycast protocol (which generally is the PoP closest to the client device) to another PoP of the cloud computing infrastructure 101. The forwarding of traffic to the other PoP can be due to the fact that the CPU usage of the first PoP approaches a load limit.

In operation, first packets 101A including a first request for a first resource are transmitted from client device 110A to the PoP 150A. For example, the first packets 101A may be IP packets destined to a first anycast address advertised by the PoP 150A. In some embodiments, the first anycast address can be advertised by a router of the PoP 150A through a BGP protocol to one or more other routers in the network 105. The packets 101A may include a request (e.g., HTTP GET request, etc.) for a network resource. The packets 101A are received at the PoP 150A as a result of an anycast protocol selecting the PoP 150A from a set of PoPs that have advertised the first anycast IP address in the network 105. The PoP 150A determines based on a forwarding table entry and an identifier of the flow of the packets that the packets are to be processed locally. In response to determining that the packets 101A are to be processed locally, the packets are processed at a compute server 120A. The compute server 120A fulfills the request included in the packets 101A. In some embodiments, the compute server 120A may transmit the packets 103A to an origin server 130A for fulfilling the request. In these embodiments, the compute server 120A receives the response included in the packets 104A. The response includes the requested network resource. Alternatively, the compute server 120B may retrieve the network resource from a cache (not illustrated) without transmitting the request to the origin server 130A. The compute server 120A then transmits the network resource to the client device 110A in a set of one or more packets 105A.

In another example, when it is determined that one or more compute servers of the PoP 150A are overloaded or any other criteria is met, as it will be discussed in further detail below, the PoP 150A can be configured to forward traffic to another PoP, e.g., PoP 150B. Thus, when packets 101B including another request for the service (e.g., a request for a network resource such as an HTTP GET), are received at the PoP 150A, the packets 101B are transmitted to the PoP 150B to be processed instead of being processed locally. The second PoP 150B is different from the PoP 150A. The second PoP 150B receives the packets. The second compute server 120B processes the packets at the network layer and at the application layer causing the request for the network resource to be fulfilled at the second compute server 120B instead of the first compute server which originally received the request from the client device 110A. For example, the compute server 120B may transmit the request to the origin server 130A and receive a response including the network resource from the origin server. Alternatively, the compute server 120B may retrieve the network resource from a cache (not illustrated) without transmitting the request to the origin server 130A. The compute server 120A then transmits the network resource to the client device 110A in a set of one or more packets 105B. In some embodiments, the second compute server 120B may forward the packets to another PoP (e.g., a third PoP that is different from the first PoP 150A) instead of processing the packet at the application layer. In these embodiments, the packets are processed at the application layer at the other PoP. In some embodiments, the packets may be successively forwarded to multiple PoPs prior to reaching a target PoP that is to process the packets at the application layer.

In some embodiments, once the request is processed at the compute server 120B, the compute server transmits the response to the client device 110A. In some embodiments, the response is transmitted through a direct server return to the client device, i.e., the response does not need to be forwarded back to the first compute server 120A to return to the client device. In other embodiments, the response is transmitted to the client device 110A via the first compute server 120A. In these embodiments, the response is transmitted to the first compute server 120A and the first compute server 120A forwards the response to the client device 110A. In some embodiments, the response is encapsulated to be transmitted through the tunnel between the second compute server 120B and the first compute server 120A. The first compute server decapsulates the packets including the response and transmits the packets to the client device.

In some embodiments described herein, the path of outgoing traffic (from the PoP to the client devices) is unchanged when compared with the path of outgoing traffic in existing cloud computing infrastructures. The outgoing traffic goes from a compute server to the client devices through the network 105 (e.g., the Internet). In contrast, the incoming traffic (from client device to PoP) may be forwarded to one or more other PoP prior to being processed. In some embodiments, incoming traffic may represent a minority of the traffic received at the PoP and the additional load on the cloud infrastructure of forwarding traffic to another PoP does not overload the system or create a problem. The extra hop (from PoP 150A to PoP 150B) does not cause a significant increase in latency for client devices accessing the cloud computing service, or an undue increase in the CPU load on the compute servers of the cloud computing infrastructure.

Determination of Forwarding Policies

Figure 1B:
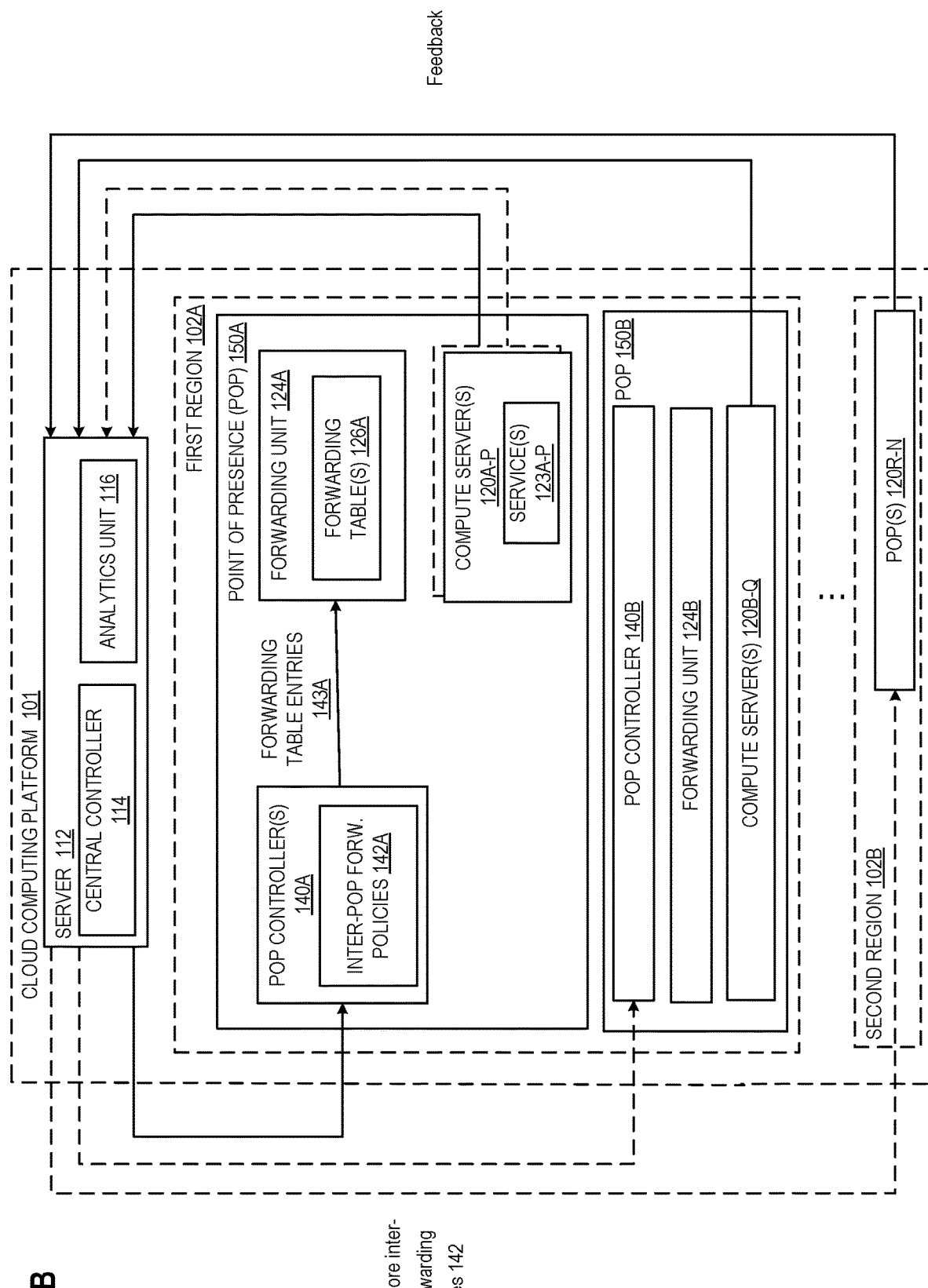
FIG. 1B illustrates a block diagram of an exemplary cloud computing infrastructure for configuring PoP management servers to load balance traffic between PoPs, in accordance with some embodiments.

FIG. 1B illustrates a block diagram of an exemplary cloud computing infrastructure for configuring PoP management servers to load balance traffic between PoPs, in accordance with some embodiments. The server 112 includes the central controller 114 and an analytics unit 116.

The analytics unit 116 is operative to 1) receive feedback from the compute servers in PoPs of the cloud computing infrastructure 101; 2) identify one or more PoPs from which traffic needs to be forwarded to another PoP, and 3) identify one or more PoPs that can receive traffic. In some embodiments, the feedback is periodically received from the compute servers of the PoPs. For example, each one of the compute servers from the PoPs 150A-N may be configured to push to the server 112 the feedback at a regular time interval. In an alternative embodiment, the server 112 may be configured to request feedback from the compute servers of the PoPs 150A-N. In some embodiments, the feedback of a compute server can be either transmitted from the compute server to the server 112 or alternatively, the feedback may be gathered at the PoP management server, e.g., at the PoP management server 140A, and transmitted from the PoP management server to the server 112. The feedback of a compute server is indicative of a state of the compute server at a given time. In some embodiments, the feedback can be a parameter indicative of a CPU load of the compute server. Alternatively or additionally, the feedback can be a parameter that measures the Quality of Service (QoS) provided by a service implemented on the compute server. The feedback can be a measure of latency and/or reliability of the service at the compute server.

The analytics unit 116 is operative to identify one or more PoPs for which traffic needs to be forwarded to another PoP. In some embodiments, the identification of a PoP can be performed based on the feedback received for one or more of the compute servers of the PoP. For example, the identification of the PoP can be performed based on the CPU load of the compute servers of the PoP. In some embodiments, PoP 150A can be identified as a PoP from which traffic needs to be forwarded to another PoP when at least one of the compute server's CPU load exceeds a threshold value. In other embodiments, PoP 150A can be identified when the CPU load of each one of multiple compute servers (e.g., a number N of compute servers, a percentage of the compute servers, etc.) is greater than the threshold value. In other embodiments, PoP 150A can be identified when a combined CPU load of multiple compute servers of the PoP 150A exceeds a threshold value. Alternatively or additionally, the identification of the PoP can be performed based on other criteria such as QoS, or type of service. For example, traffic of a particular type of service (e.g., video service) may have stricter requirements for latency/reliability compared to other types of services (e.g., regular web page surfing, email, etc.). Thus, a PoP that is receiving the type of traffic with stricter requirements may not be identified as a PoP from which traffic is to be forwarded. In other embodiments, the PoP 150A may be selected and the type of service may be used in the determination of forwarding policies and/or forwarding table entries for the particular PoP. In another example, the identification of the PoP can be performed based on other parameters than qualify the service provided at the PoPs (e.g., Quality of Service (QoS) parameters, latency and/or reliability measures, etc.).

The analytics unit 116 is further operative to identify one or more PoPs to which traffic can be forwarded from one or more other PoPs. In some embodiments, a PoP can be identified, e.g., PoP 150B, based on the feedback received from one or more of the compute servers of the PoP. For example, the PoP 150B is identified based on the feedback that is received for the compute servers 120B-Q of the PoP 150B. The feedback received from the compute servers can be a parameter indicative of the CPU load. In some embodiments, the analytics unit 116 considers all of the compute servers 120B-Q of the PoP 150B. For example, the analytics unit 116 may determine that individual compute servers have a CPU load that is lower than a predetermined threshold value. In some embodiments, the analytics unit 116 may evaluate whether at least one of the compute servers in the PoP 150B has a CPU load that is lower than the threshold value to identify the PoP 150B as a PoP that can receive forwarded traffic. Alternatively, the analytics unit 116 may identify the PoP 150B when at least a number of compute servers (a predetermined number of compute servers, or a percentage of the compute servers) have a CPU load that is lower than the threshold value. Alternatively or additionally, the analytics may determine that a combination of the compute servers 120B-Q (e.g., a subset or all of the compute servers 120B-Q) have a combined CPU load that is lower than a predetermined threshold value. In these embodiments, the CPU load of some of the compute servers of the PoP 150B may have a relatively high load but a total load across the compute servers in the PoP does not exceed a threshold value. Alternatively or additionally, the identification of the PoP can be performed based on other criteria such as QoS or type of service. For example, traffic of a particular type of service (e.g., video service) may have stricter requirements for latency/reliability compared to other types of services (e.g., regular web page surfing, email, etc.). Thus, a PoP that is receiving the type of traffic with stricter requirements may not be identified as a PoP to which traffic is to be forwarded. While the example of FIG. 1B shows a PoP 150A and PoP 150B being identified as respectively a PoP from which traffic is to be forwarded and a PoP to which traffic is to be forwarded, in other embodiments, multiple PoPs can be identified as either PoPs from which traffic is to be forwarded or as PoPs to which traffic can be forwarded.

Once the PoP(s) from which traffic is to be forwarded and the PoP(s) to which traffic is to be forwarded are identified, the central controller 114 determines the inter-PoP forwarding policies 142. The inter-PoP forwarding policies 142 determine the forwarding of traffic between the PoPs that enables the load balancing of traffic between the PoPs of the cloud computing infrastructure 101. A forwarding policy for a PoP, e.g., PoP 150A, includes 1) an amount of traffic that needs to be forwarded from the PoP and 2) a destination network address of a PoP towards which traffic is to be forwarded. In some embodiments, the destination network address can be an external address (e.g., external IP address) of a compute server of the PoP, where the compute server hosts the cloud computing service. Alternatively or additionally, the destination network address can be an external address of a network device in the PoP that has other functionalities. For example, the network device can be a router or a forwarding unit in the PoP. In some embodiments, the destination address is a virtual IP address that is routed to any one of a group of one or more compute servers of the PoP.

In some embodiments, the determination of the forwarding policies is performed based on the identified one or more PoP(s) from which traffic needs to be forwarded and based on the identified one or more PoP(s) towards which traffic needs to be forwarded. In some embodiments, the determination of the forwarding policies is performed by selecting a pair of PoPs, a first PoP 150A and a second PoP 150B, where the first PoP is the PoP from which traffic is to be forwarded and the second PoP 150B is the PoP that is to receive the traffic. In some embodiments, the determination of the forwarding policies for PoP 150A includes the selection of more than one PoP to which traffic is to be forwarded from PoP 150A. In some embodiments, the forwarding policies determined enable the PoP 150A to forward traffic to PoP 150B and further receive traffic from another PoP. In some embodiments, the PoPs can be located in a same geographical region, e.g., first region 102A, than the PoP of the compute server 120A, while in other embodiments, the PoP(s) can be located in different geographical regions, e.g., first region 102A and second region 102B.

The server 112 transmits the forwarding policies 142 to one or more PoPs of the cloud computing infrastructure 101. For example, the server 112 transmits the forwarding policies to PoP 150A for forwarding traffic to PoP 150B. The configuration of the PoPs results in at least one PoP, e.g., PoP 150A, forwarding a portion of the traffic received according to the anycast protocol to another PoP, e.g., 150B. In some embodiments, the forwarding policies for a PoP may cause the PoP to forward traffic to multiple ones of the other PoPs in the cloud computing infrastructure 101.

In some embodiments, PoP 150A may be configured to forward traffic to PoP 150B and PoP 150B may further be configured to forward traffic to another PoP, such as PoP 150R. This configuration can be used to avoid undesired latency impact for users. For example, if PoP 150A is identified as an overloaded PoP that needs to forward traffic to another PoP and PoP 150R is identified as an underloaded PoP, traffic from PoP 150A could be sent to PoP 150R. However, PoP 150A and 150R are located in two different regions, region 102A and region 102B, and PoP 150A is determined to be far from PoP 150R. In contrast, PoP 150B can be closer to PoP 150A and to PoP 150R as a distance between PoP 150A and PoP 150B and the distance between PoP 150B and PoP 150R are less than the distance between PoP 150A and 150B. In this scenario, the controller 114 determines one or more forwarding policies that cause traffic to be forwarded from PoP 150A towards PoP 150B and traffic to be forwarded from PoP 150B to PoP 150R. This ensures that none of PoP 150A and PoP 150B get overloaded while avoiding a latency overhead for packets if forwarded from PoP 150A to PoP 150P. The determined forwarding policies reduce the maximum latency impact encountered by users.

The determination of the inter-PoP policies 142 is a dynamic mechanism that is performed periodically based on the feedback received for the compute servers of the PoPs. In some embodiments, changes to the forwarding policies can occur at a high frequency such as multiple times per hour. In some embodiments, the inter-PoP forwarding policy that is determined, can be a new inter-PoP forwarding policy (e.g., a policy to forward traffic from PoP 150A to PoP 150B), an update to an existing inter-PoP policy, or a cancellation of a previously existing inter-PoP forwarding policy. For example, when the central controller 114 determines that an existing inter-PoP forwarding policy is to be updated, it may transmit a request to modify the fraction of traffic that is forwarded for an established forwarding relationship.

FIG. 1C illustrates a block diagram of exemplary inter-PoP forwarding policies 142A that can be configured for PoP 150A at a first time t1, in accordance with some embodiments. FIG. 1C shows two scenarios of forwarding policies that can be configured for a PoP of the cloud computing infrastructure 101. In scenario A, the forwarding policy 146A identifies an amount of traffic that is to be forwarded for the PoP 105A. The amount of traffic can be expressed in percentage of traffic received from client devices by the PoP 150A. The amount of traffic is associated with a destination address, e.g., address of PoP 150B. For example, the destination address can be an external IP address of a compute server 120B in PoP 150B. Optionally, inter-PoP forwarding policies 142A can include an additional forwarding policy 147A that specifies an additional amount of traffic (e.g., 10%) that is to be forwarded to a destination address of another PoP, e.g., PoP 150C (not illustrated in FIG. 1A). When multiple forwarding policies are defined, this results in a total amount of traffic to be forwarded to multiple PoPs from PoP 150A, here 15% of traffic is forwarded, while the remainder of the traffic (e.g., 85% of traffic received at PoP 150A) is not forwarded and is processed locally by one or more compute servers of the PoP 150A. In scenario A, one or both of the forwarding policies 146A and 147A can be updated at time t2. FIG. 1D illustrates the updated forwarding policies at the second time t2. In this example, the forwarding policy 146A is updated to increase the amount of traffic that is forwarded to PoP 150B from 5% to 10%, while the amount of traffic that is forwarded to PoP 150C is not increased and remains the same. The increase of the amount of traffic that is to be forwarded to PoP 150B results in a total amount of traffic to be forwarded to multiple PoPs from PoP 150A to increase, here 20% of traffic is forwarded. The remainder of the traffic (e.g., 80% of traffic received at PoP 150A) is not forwarded and is processed locally by one or more compute servers of the PoP 150A.

Returning to FIG. 1C, in another scenario, scenario B, the forwarding policies 142A may include forwarding policies, e.g., 148A and 149A, that specify an amount of traffic to be forwarded for each type of traffic from multiple types of traffic. For example, the traffic can be classified in different tiers, where a first tier (Tier one) is associated with a first type of service provided at the cloud computing infrastructure 101 and a second tier (Tier two) that is associated with a second type of service that is provided at the cloud computing infrastructure 101. In one non-limiting example, a first tier of traffic can be traffic of customers that subscribe to a paying service while the second tier can be traffic of customers that subscribe to a free service. Additional tiers of traffic can be defined (e.g., each tier can be associated with a different level of paid service(s), etc.) resulting in an amount of traffic for each tier being forwarded from PoP 150A to another PoP. In some embodiments, some tiers of traffic may not be forwarded (e.g., traffic of customers that subscribe to paid service) while other tiers of traffic are forwarded (e.g., traffic of customers that subscribe to free service). In the illustrated example of FIG. 1C, policy 148A defines that 2% of tier one of traffic is to be forwarded to PoP 150B and 5% of tier two of traffic is to be forwarded to PoP 150B at time t1, while the remainder of the traffic (e.g., 93% of traffic received at PoP 150A, which may include tier one or tier two traffic) is not forwarded and is processed locally by one or more compute servers of the PoP 150A. The forwarding policies are later updated (at time t2). FIG. 1D illustrates the updated forwarding policies. The forwarding policies are updated such that 0% of tier one traffic is to be forwarded, indicating that the traffic in this first tier is not forwarded and is processed locally in the PoP 150A. Forwarding policy 149A is updated at time t2 such that 10% of tier two traffic is forwarded to PoP 150B. The decrease in the amount of tier one traffic that is to be forwarded from PoP 150A and the increase in the amount of tier two traffic that is to be forwarded from PoP 150A results in a total amount of traffic to be forwarded from PoP 150A to increase, here from 7% to 10% of traffic is forwarded. The remainder of the traffic (e.g., 90% of traffic received at PoP 150A) is not forwarded and is processed locally by one or more compute servers of the PoP 150A. The embodiments described herein allow for a fine-grained control over the amount of traffic being forwarded per tier of traffic handled by a PoP.

Configuration of Forwarding Tables Based on Forwarding Policies.

Referring back to FIG. 1B, once the inter-PoP forwarding policies 142 are transmitted from the server 112 to the PoP(s) 150A-N, they are converted into forwarding table entries in the PoP(s). For example, a PoP management server 140A receives and stores the inter-PoP policies 142A. The inter-PoP forwarding policies 142A are converted into forwarding table entries 143A. The PoP controller 140A updates the forwarding tables in response to changes to the inter-PoP forwarding policies. In some embodiments, in order to minimize disruption to established connections, the PoP controller 140A modifies as many forwarding table entries as are needed to bring the forwarding table into conformance with the forwarding policy. The PoP controller 140A selects from table entries in the forwarding table(s) 126A, one or more table entries to be modified. When selecting forwarding table entries to modify, the PoP controller 140A may select those that were least recently modified, which allows to minimize disruption of established connections.

In some embodiments, the forwarding table entries 143A are transmitted to one or more of compute servers 120A-P of the PoP 150A to be stored in forwarding tables of the compute servers. In some embodiments, different forwarding entries can be generated for different compute servers of the same PoP. For example, if the anycast address associated with a first compute server 120A is different from the anycast address associated with a second compute server 120B, different traffic will reach the different compute servers based on these two different anycast addresses. In this embodiment, different forwarding entries are populated for the different compute servers. In other embodiments, the same forwarding table entries are forwarded to multiple compute servers in a PoP.

In some embodiments, the forwarding table entries 143A are stored in the forwarding unit 124A. In these embodiments, the packets received at the PoP are processed at the forwarding unit 124A prior to being transmitted according to the forwarding table entries to a local compute server of the PoP or a remote compute server of another PoP to be processed according to the cloud computing service.

While a single forwarding table 126A is illustrated in the forwarding unit 124A, in some embodiments multiple forwarding tables can be configured. For example, a first forwarding table can be configured for a first tier of traffic (tier one) and a second forwarding table can be configured for another tier of traffic (e.g., tier two). In some exemplary embodiments, a forwarding table is configured for each tier of traffic. In other exemplary embodiments, a single forwarding table is used to store forwarding entries associated with different tiers of traffic.

In some embodiments, the generation of forwarding table entries for forwarding a flow of traffic to a remote PoP is dynamic. A forwarding policy is a forwarding relationship between a first PoP and a second PoP, where traffic is forwarded from the first PoP to the second PoP. When the amount of traffic associated with a forwarding relationship increases, an appropriate number of forwarding table entries is generated or updated to forward flows to the remote PoP. Alternatively, when the amount of traffic associated with the forwarding relationship is reduced, an appropriate number of forwarding table entries is updated for forwarding the flows to local compute servers of the PoP receiving the traffic instead of forwarding traffic to the remote PoP. Changes to the forwarding policy causes the update of forwarding table entries.

In some embodiments, the generation of forwarding table entries for forwarding traffic between PoPs ensures that traffic forwarded from a first PoP to a second PoP is not forwarded from the second PoP to a third PoP. Respecting this condition allows to avoid traffic looping from one PoP and back to itself via another PoP and avoids unnecessary latency that would be introduced by repeated forwarding of the same traffic to multiple PoPs.

In some embodiments, the forwarding table entries that are selected to be updated when there is a change in the amount of traffic to forward (reduced or increased) for a PoP, the forwarding table entry with the least-recent changes is selected. This avoids having the same forwarding table entries (and consequently the same flows of traffic) being modified over and over. The selection of the forwarding tables with the least recent changes results in less connection being disturbed and the system maintaining these connections for a longer period of time while enabling load balancing of traffic across multiple PoPs in the cloud computing infrastructure.

Forwarding Traffic from One PoP to Another

Figure 1E:
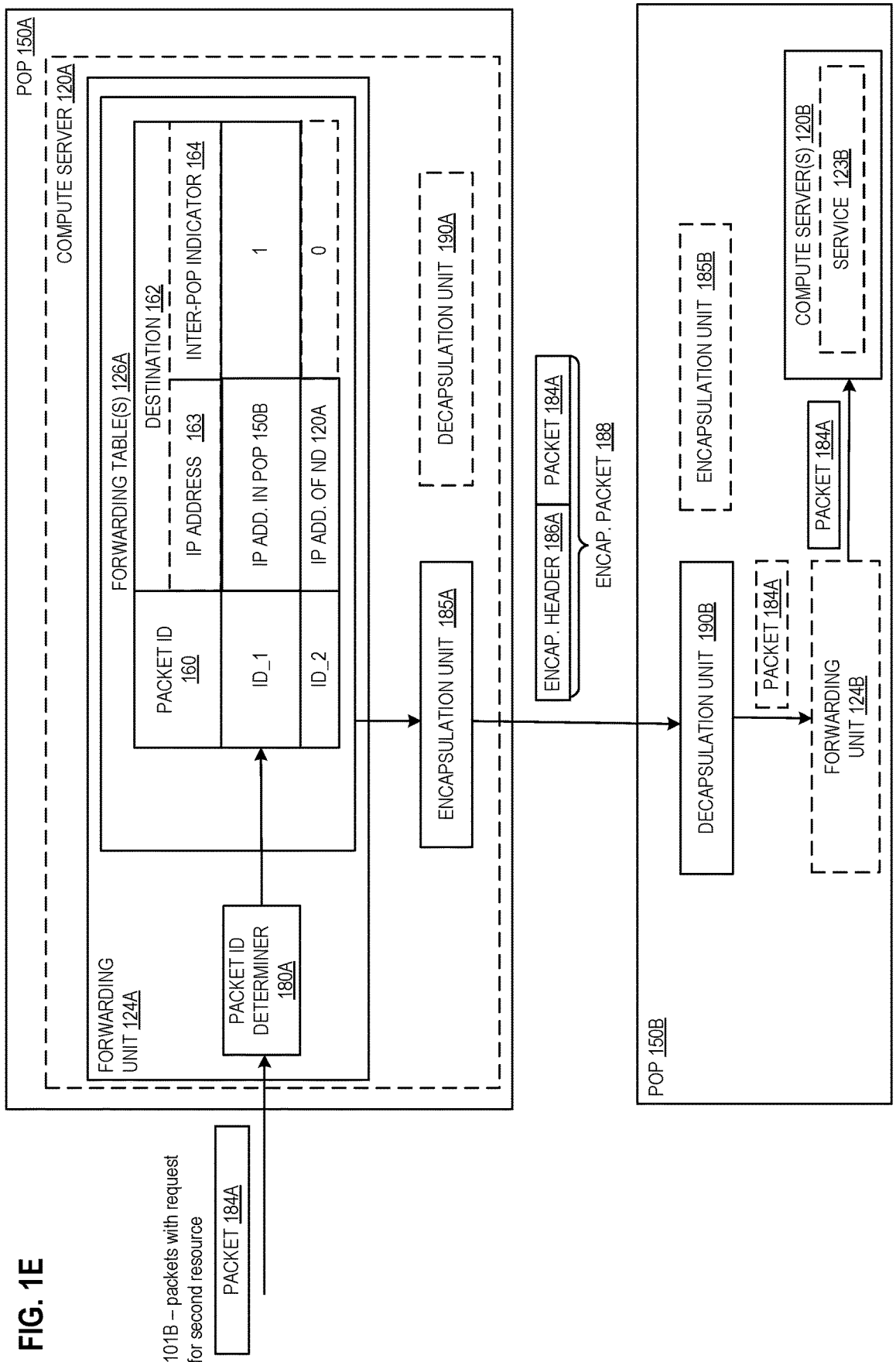
FIG. 1E illustrates a block diagram of an exemplary forwarding unit for forwarding traffic to another PoP according to one embodiment.

FIG. 1E illustrates a block diagram of an exemplary forwarding unit for forwarding traffic to another PoP according to one embodiment. The forwarding table 126A includes one or more forwarding entries that are generated from forwarding policies 142A for forwarding traffic from PoP 150A to PoP 150B. A forwarding table entry includes a packet identifier, e.g., ID_1 and ID 2, and an associated destination for the packet. The packet identifier identifies the flow of packets received from client devices such as client device 110A.

In one embodiment, the packet identifier is generated at the packet ID determiner 180 upon receipt of the packet. The packet identifier can be generated by hashing one or more of the fields that define a flow of traffic that is to be received at the PoP. Additionally or alternatively, the packet identifier can be generated by selecting a portion of the hashed value (e.g., last N bits) obtained from the fields of the packet. For example, the packet ID may be determined by hashing a five-tuple of fields of the packet including the protocol version (e.g., the version of the IP protocol (IPv4 or IPv6, etc.), the source address (e.g., source IP address) and source port number (e.g., source TCP port number), a destination address (e.g., destination IP address) and destination port number (e.g., destination TCP port number) of a packet.

In some embodiments, different fields of a packet of a flow of traffic can be used to generate the identifier. The fields can be selected to enable a certain forwarding behavior for the compute server 120A of the first PoP 150A. In one exemplary implementation, the choice of the five-tuple described above for generation of the packet identifier enables the forwarding of packets of different transport layer connections (e.g., TCP connections) from a single client device 110A towards multiple PoPs of the cloud computing infrastructure. For example, a first connection from client device 110A is defined with a first tuple including first protocol version, first source address, first source port number and first destination address and first destination number and a second connection from the client device 110A is defined with a second tuple including second protocol version, second source address, second source port number, second destination address and second destination number, where some of the first fields and the second fields are different (e.g., first and second port number are different) resulting into two different identifiers for packets of these two transport layer connections. The two IDs can be associated with two different destinations 114 resulting in packets of the two connections providing from the same client device 110A to be forwarded to two different PoPs. In an alternative implementation, the identifier of the packet can be generated based on the source address (e.g., source IP address) and the destination address (e.g., destination IP address) without including the port numbers and/or the protocol version, resulting in packets of different transport layer connections from the same client device 110A to be associated with the same packet ID. In this exemplary implementation, the packets received from different connections of the client device 110A with the compute server 120A are forwarded according to a same forwarding entry towards a same forwarding destination.

The destination 114 can include a network address 163 to forward traffic to the PoP 150B. The address can be an external IP address of a compute server 120B. The address can be a virtual IP address of a group of compute servers (which include the compute server 120B) of the PoP 150B. The address can be an external IP address of an edge network device in the PoP 150B that is to receive incoming traffic to the PoP. For example, the edge network device can include the forwarding unit 124B. Additionally or alternatively, the edge network device can include a router of the PoP 150B. In some embodiments, the edge network device can include a decapsulation unit 190B. The destination 114 further includes an inter-PoP indicator 164. The inter-PoP indicator 164 indicates whether the packet is to be forwarded to a PoP that is different from the current PoP processing the packet. The inter-PoP indicator 164 may include a first value (e.g., 1) to indicate that the forwarding is inter-PoP (towards another PoP) or a second value (e.g., 0) to indicate that the forwarding is intra-PoP (within the same PoP).

In operation a packet 184A is received at the PoP 150A. The packet ID determiner 180A determines an identifier ID_1 of the packet 184A. In some embodiments, the packet 184B is an IP/TCP packet that includes a TCP header, an IP header, and a payload. The TCP header includes a source and destination port numbers. The IP header includes a source and destination IP address, and a version of the IP protocol. The identifier ID_1 is used to access a forwarding table entry in the forwarding table 126A. The identifier ID_1 is associated with a forwarding table entry that includes an IP address of the PoP 150B and an inter-PoP indicator that indicates that the packet is to be forwarded to another PoP. Based on the inter-PoP indicator, the packet 184A is encapsulated according to an encapsulation protocol at the encapsulation unit 185A and the destination address retrieved from the forwarding table. In some embodiments, the encapsulation protocol can be Generic Routing Encapsulation (GRE) protocol. In some embodiments, the encapsulation protocol can be another protocol (e.g., Generic User Datagram Protocol (UDP) Encapsulation (GUE) or other). The packet 184A is encapsulated to include an encapsulation header 186A. The encapsulation header 186A includes the IP address of the first PoP 150A as a source address and a destination IP address of the second PoP 150B (e.g., external IP address of the compute server 120B, an external IP address of an edge network device in the PoP 150B, or a virtual IP address, etc.). In some embodiments, the encapsulation protocol can be GRE, GUE, or another encapsulation protocol. The encapsulated packet 188 is transmitted to the PoP 150B through a tunnel (e.g., GRE tunnel) over the network 105. The PoP 150 receives the encapsulated packet 188 and decapsulates the encapsulated packet 188 at the decapsulation unit 190B to obtain the packet 184A.

The encapsulated traffic including the encapsulated packet 188 travels over the existing network 105. In some embodiments, the encapsulated traffic travels over an external network formed at least in part by the PoPs of the cloud computing infrastructure. The destination address of an encapsulated packet is an external IP address of a network device in the PoP 150B, a virtual IP address in the PoP 150B, or an external IP address of an edge network device.

Following the decapsulation of the encapsulated packet 188 at the POP 150B, the packet 184A is processed at the POP 150B as if it were received from the client device 110A. In some embodiments, the packet 184A is processed at the forwarding unit 124B prior to being transmitted to the compute server 120B for processing according to the cloud computing service. In other embodiments, the packet 184A is directly transmitted to the compute server 120B to be processed according to the cloud computing service. In some embodiments, the packet 184A is processed at the compute server 120B with zero or more other packets of the same flow to obtain the request for the second resource (e.g., one or more packets including the packet 184A can be processed at a network layer to obtain an application layer request (e.g., HTTP request) for the second request). The request for the second resource is processed by the service 123B. In some embodiments, when the request for the second network resource is processed, the request is fulfilled by retrieving the second network resource (from a cache or by transmitting a request to an origin server and receiving a response from the origin server). The compute server 120B transmits the second response to the client device 110A in one or more packets (IP packets). In some embodiments, the packet 184A may be forwarded to another PoP instead of being processed at the application layer in the POP 150B.

Forwarding of Traffic to Another PoP while Maintaining Existing Connections

In some embodiments, the update made to the forwarding tables 122A in response to the receipt of a new inter-PoP forwarding policy does not disrupt established connections between the client devices and the PoPs. That is, changes made to the inter-PoP forwarding policy of a PoP ensures that established connections are maintained such that traffic received through these connections continues to be received without interruption. The forwarding mechanisms described herein enable new connections to obey new inter-PoP forwarding policies while ensuring that existing connections follow previous forwarding policies without interruption. In some embodiments, the support of existing connections can be temporary such that a connection that is maintained can be discontinued after a period of time. In some embodiments, the period of time can be determined empirically by the central controller. In other embodiments, the period of time can be set by an administrator of the cloud computing infrastructure 114.

In one example, a first forwarding policy can be configured in the first PoP 150A to cause a first flow of traffic received from client device 110A through a first connection at the first PoP 150A to be forwarded to the second PoP 150B instead of being processed at the first PoP 150A. An update of the first forwarding policy at a later time causes traffic received from the same client device through a new connection to be forwarded to another PoP (e.g., the local PoP or a different remote PoP).

Figure 1F:
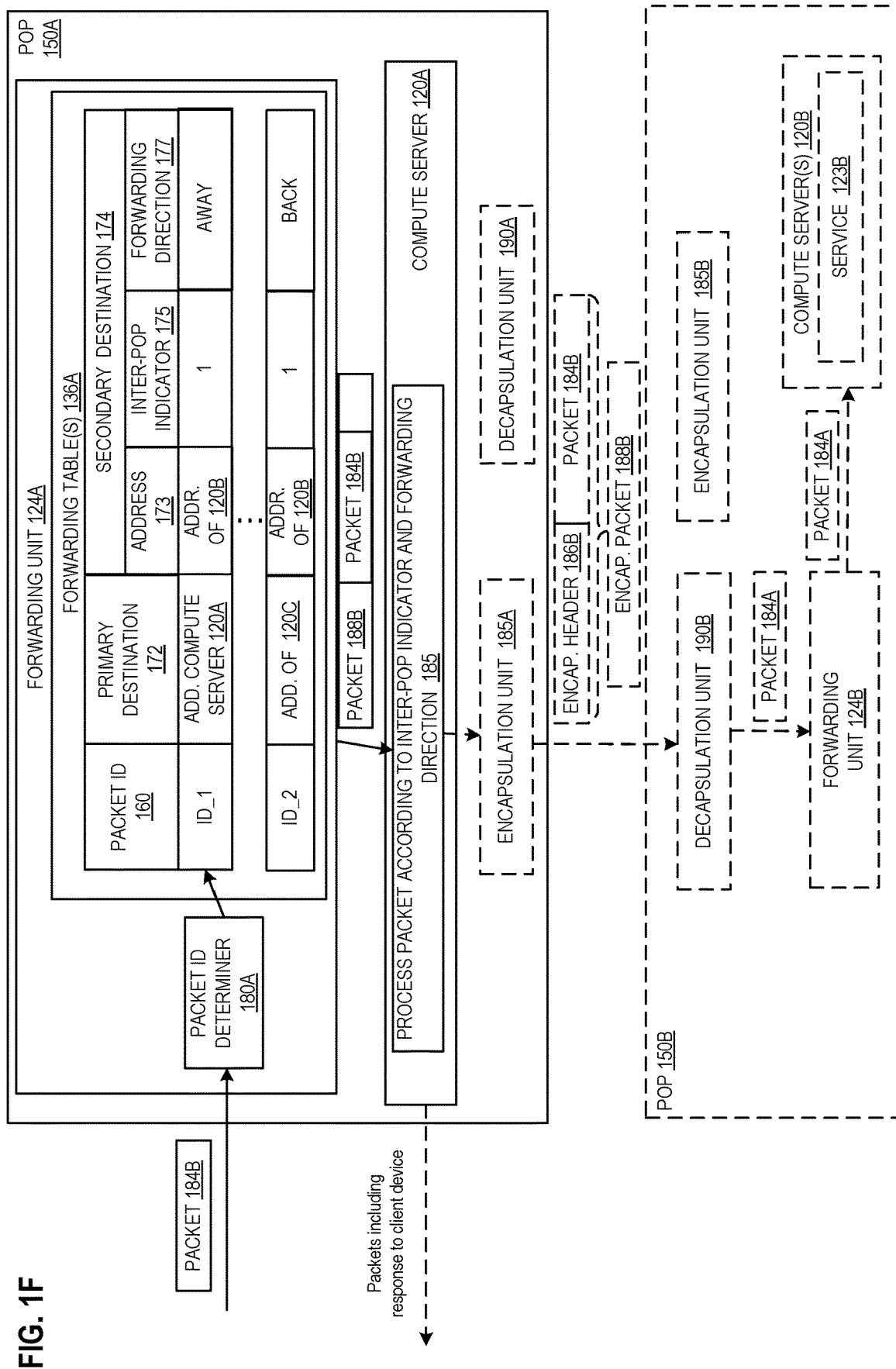
FIG. 1F illustrates a block diagram of an exemplary forwarding unit for forwarding traffic to another PoP according to one embodiment where existing connections are maintained.

FIG. 1F illustrates a block diagram of an exemplary forwarding unit for forwarding traffic to another PoP according to one embodiment where existing connections are maintained. Similarly to the embodiments described above with reference to FIG. 1F, the forwarding unit 124A includes a packet ID determiner 180A and an encapsulation unit 185A. The packet ID determiner 180A and the encapsulation unit 185A perform similar operations as the one described with reference to FIG. 1E. The forwarding unit 124A further includes forwarding table(s) 136A. In some embodiments, the forwarding table(s) 136A include some differences with respect to the forwarding table(s) 126A that will be described in further detail herein.

The forwarding table(s) 136A includes one or more forwarding table entries. A forwarding table entry includes a packet identifier, e.g., ID 1, ID 2. The packet identifier is determined as described in further detail above with respect to the operations of the packet ID determiner 180A. A forwarding table entry includes a primary destination 172 and a secondary destination 174. A primary destination 172 includes a network address of a network device. In some embodiments, the network address is an external IP address of a compute server in the PoP. The secondary destination 174 includes a network address 173 of a network device, an inter-PoP indicator 175, and a forwarding direction 177. In some embodiments, the network address is an external IP address of the network device. For example, the network address is an external IP address for a first PoP or an external IP address for a second PoP. The external IP address of a PoP can be an IP address of a compute server in the PoP, an edge network device in the PoP, or a virtual IP address that is routed to any one or more of compute servers in the PoP. The inter-PoP indicator indicates whether the packet is to be forwarded to another PoP that is different from PoP 150A. The inter-PoP indicator 164 may include a first value (e.g., 1) to indicate that the forwarding is inter-PoP (towards another PoP) or a second value (e.g., 0) to indicate that the forwarding is intra-PoP (within the same PoP). The forwarding direction specifies the disposition of packets that initiate new connections. The forwarding direction can indicate that such packets are to be forwarded away, so that new connections will be forwarded to another PoP referred to by the secondary destination. Alternatively it can indicate that such packets are to be forwarded back, meaning that such packets and their associated connections are handled by the compute server referred to by the primary destination.

The operation of the forwarding unit 124A will be described with respect to packet 184B. In some embodiments, the packet 184B is an IP/TCP packet that includes a TCP header, an IP header, and a payload. The TCP header includes a source and destination port numbers. The IP header includes a source and destination IP address, and a version of the IP protocol. The PoP 150A receives the first packet 184B. The first packet includes as a first destination address an anycast address advertised by the first PoP for reaching the cloud computing service. The PoP 150A identifies based on a forwarding table entry and a first identifier ID_1 for a first flow of the first packet, a primary destination 172 and a secondary destination 174. The primary destination includes an external network address of a local compute server in the PoP 150A. For example, the primary destination 172 includes the IP address of the compute server 120A. The secondary destination includes an external network address of a second compute server that is located in a second PoP 150B that is different from the first PoP. The secondary destination further includes an inter-PoP indicator 175 (here value=1) that indicates that the packet can be subject to remote forwarding. The second destination further includes a forwarding direction "away" indicating that the packet can be forwarded away from the current PoP 150A.

The first packet is transmitted to a first compute server 120A of the first PoP 150A. Transmitting the first packet to the first compute server 120A includes encapsulating the first packet according to an encapsulation protocol in an encapsulated packet and the second network address of the second PoP is included in a field of an encapsulation header of the encapsulated packet. In some embodiments, the encapsulation protocol can be GRE, GUE, or another encapsulation protocol. In other embodiments, the first packet is processed locally at the first PoP without the need for transmitting to another local compute server. The PoP 150A determines whether a first connection is already established for the first flow locally. When the packet is transmitted to the first compute server 120A, the determination of whether a connection already exists for the packet is performed at the compute server 120A. For example, the PoP 150A (which may be performed by the compute server 120A or another network device in the PoP 150A) may determine whether a TCP connection exists in a first compute server 120A for the flow of the packet that is received. In response to determining that a first connection is established at the first compute server for the first flow, the first packet is processed at the first PoP 150A according to the cloud computing service. In some embodiments, processing the packet in the first PoP 150A results in the PoP 150A transmitting one or more packets including a response to the client device 110A. The response is for the request received at the PoP 150A with one or more packets that include the first packet. In this exemplary scenario, while the flow of the first packet is defined to be forwarded to a remote PoP in the forwarding table entry, the forwarding of packets is performed such that packets received through existing connections (e.g., TCP connections) are processed locally without being forwarded (i.e., without being disrupted).

Alternatively, when the PoP 150A determines that there is no connection established for the flow of the first packet in the first PoP, the PoP 150A determines whether the packet is an initial packet of a new connection for the first flow. When the first packet is not the initial packet of the new connection for the first flow, the PoP 150A transmits the packet to the second PoP to be processed in the second PoP 150B according to the cloud computing service. When the packet is not a packet for a new connection (e.g., a SYN packet in TCP) and there are no open connections for that flow in the local PoP, this is an indication that the packet belongs to a flow associated with an open connection in the remote PoP and therefore the packet is forwarded to the PoP 150B for processing. The transmission of the packet to the remote PoP includes encapsulating the packet 184B to obtain an encapsulated packet 188B. The packet is encapsulated to include an encapsulation header. The encapsulation header includes the IP address of the first PoP 150A and a destination IP address of the second PoP 150B (e.g., external IP address of the compute server 120B, an external IP address of an edge network device in the PoP 150B, or a virtual IP address, etc.). In some embodiments, the encapsulation protocol can be GRE, GUE, or another encapsulation protocol.

Alternatively, in response to determining that the packet is the initial packet of the new connection for the flow (e.g., a SYN packet in TCP) the first packet 184B is processed according to the forwarding direction (here away). When the forwarding direction is "away," this indicates that the forwarding of this flow to the remote PoP is enabled and the packet 184B can be forwarded towards the second PoP 150B for processing. The transmission of the packet 184B to the remote PoP includes encapsulating the packet to obtain an encapsulated packet 188B. The packet is encapsulated to include an encapsulation header. The encapsulation header includes the IP address of the first PoP 150A and a destination IP address of the second PoP 150B (e.g., external IP address of the compute server 120B, an external IP address of an edge network device in the PoP 150B, or a virtual IP address, etc.). In some embodiments, the encapsulation protocol can be GRE, GUE, or another encapsulation protocol. Alternatively, when the forwarding direction is "back," this is an indication that the forwarding of packets to a remote PoP is not enabled and therefore the packet is to be processed locally at the first compute server 120A of the first PoP 150A.

The embodiments herein enable the forwarding of traffic to remote PoPs while maintaining existing connections. The forwarding table entries can be configured/updated with appropriate forwarding directions to indicate whether the forwarding is enabled or not. The use of the two destinations (primary and secondary) allows to forward traffic to the local compute server or a remote compute server of another PoP based on whether a connection is established for this traffic at a respective compute server. Regardless of whether the remote forwarding is enabled or not, established connections are maintained in both the remote PoP and the local PoP.

Figure 2A:
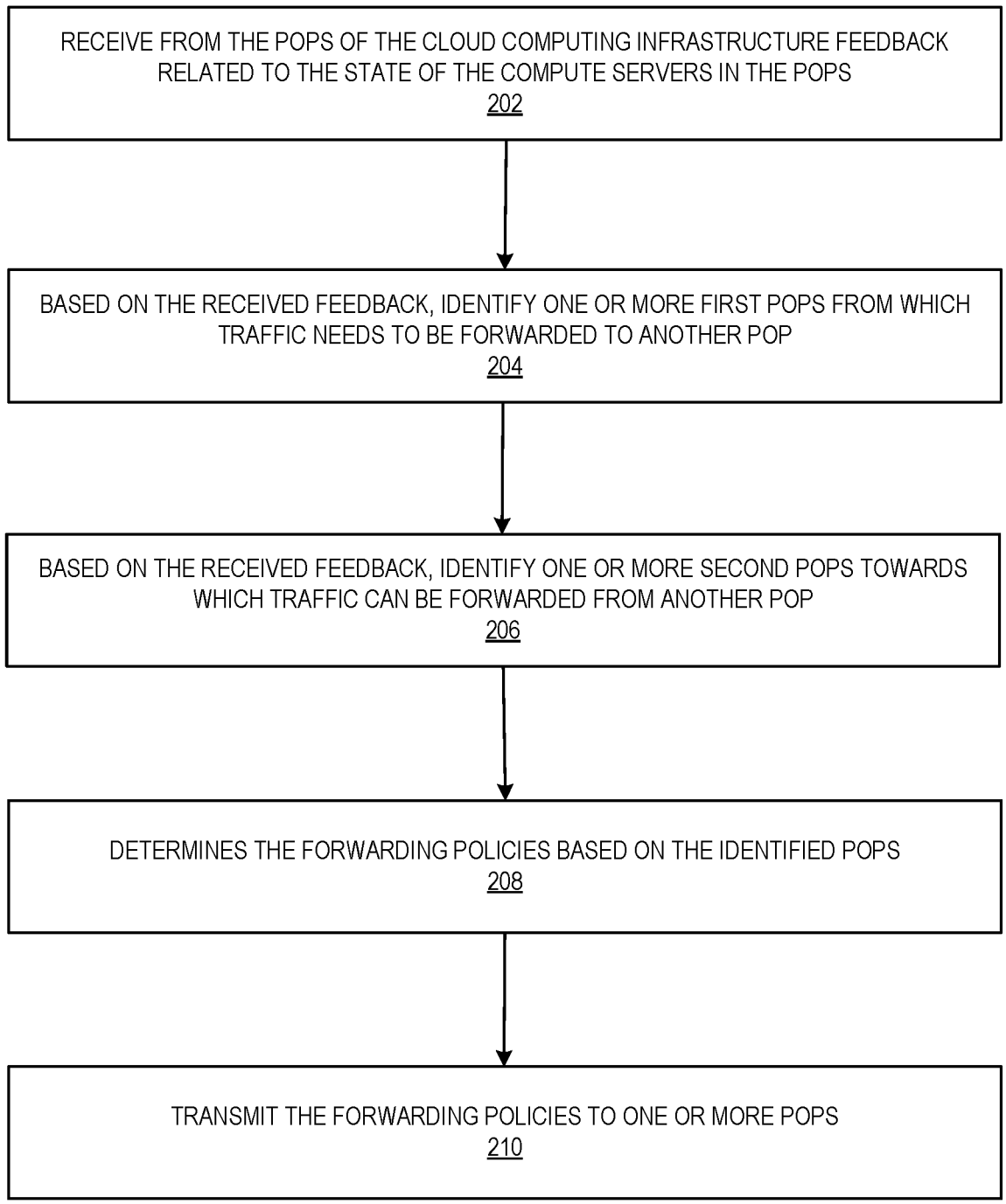
FIG. 2A illustrates a flow diagram of exemplary operations that can be performed for determining forwarding policies for a PoP in the cloud computing infrastructure in accordance with some embodiments.

Exemplary Operations:

FIG. 2A illustrates a flow diagram of exemplary operations that can be performed for determining forwarding policies for a PoP in the cloud computing infrastructure in accordance with some embodiments.

At operation 202, server 112 receives from the PoPs of the cloud computing infrastructure 101 feedback related to the state of compute servers in the PoPs. The feedback of a compute server is indicative of a state of the compute server at a given time. In some embodiments, the feedback can be a parameter indicative of a CPU load of the compute server. Alternatively or additionally, the feedback can be a parameter that measures the Quality of Service (QoS) provided by a service implemented on the compute server. The feedback can be a measure of latency and/or reliability of the service at the compute server.

In some embodiments, the feedback is periodically received from the compute servers of the PoPs. For example, each one of the compute servers from the PoPs 150A-N may be configured to push to the server 112 the feedback at a regular time interval. In an alternative embodiment, the server 112 may be configured to request feedback from the compute servers of the PoPs 150A-N. In some embodiments, the feedback of a compute server can be either transmitted from the compute server to the server 112 or alternatively, the feedback may be gathered at the PoP management server from one or more compute servers, e.g., PoP management server 140A, and transmitted from the PoP management server 140A to the server 112.

The flow of operations moves to operation 204. At operation 204, the server 112 identifies, based on the received feedback, one or more first PoPs from which traffic needs to be forwarded to another PoP. For example, the server 112 may identify the PoP 150A. In some embodiments, the identification of a PoP can be performed based on the feedback received for one or more of the compute servers of the PoP. For example, the identification of the PoP can be performed based on the CPU load of the compute servers of the PoP. In some embodiments, PoP 150A can be identified as a PoP from which traffic needs to be forwarded to another PoP when at least one of the compute server's CPU load exceeds a threshold value. In other embodiments, PoP 150A can be identified when the CPU load of each one of multiple compute servers (e.g., a number N of compute servers, a percentage of the compute servers, etc.) is greater than the threshold value. In other embodiments, PoP 150A can be identified when a combined CPU load of multiple compute servers of the PoP 150A exceeds a threshold value. Alternatively or additionally, the identification of the PoP can be performed based on other criteria such as QoS, or type of service. For example, traffic of a particular type of service (e.g., video service) may have stricter requirements for latency/reliability compared to other types of services (e.g., regular web page surfing, email, etc.). Thus, a PoP that is receiving the type of traffic with stricter requirements may not be identified as a PoP from which traffic is to be forwarded. In other embodiments, the PoP 150A may be selected and the type of service may be used in the determination of forwarding policies and/or forwarding table entries for the particular PoP.

The flow of operations moves to operation 206. At operation 206, the server 112 identifies, based on the received feedback, one or more second PoPs towards which traffic can be forwarded from another PoP. In some embodiments, a PoP can be identified, e.g., PoP 150B, based on the feedback received from one or more of the compute servers of the PoP. The feedback received from the compute servers can be a parameter indicative of the CPU load. In some embodiments, the server 112 considers all of the compute servers 120B-Q of the PoP 150B. For example, the server 112 may determine that individual compute servers have a CPU load that is lower than a predetermined threshold value. In some embodiments, the server 112 may evaluate whether at least one of the compute servers in the PoP 150B has a CPU load that is lower than the threshold value to identify the PoP 150B as a PoP that can receive forwarded traffic. Alternatively, the server 112 may identify the PoP 150B when at least a number of compute servers (a predetermined number of compute servers, or a percentage of the compute servers) have a CPU load that is lower than the threshold value. Alternatively or additionally, the server 112 may determine that a combination of the compute servers 120B-Q (e.g., a subset or all of the compute servers 120B-Q) have a combined CPU load that is lower than a predetermined threshold value. In these embodiments, the CPU load of some of the compute servers of the PoP 150B may have a relatively high load but a total load across the compute servers in the PoP does not exceed a threshold value. Alternatively or additionally, the identification of the PoP can be performed based on other criteria such as QoS or type of service. For example, traffic of a particular type of service (e.g., video service) may have stricter requirements for latency/reliability compared to other types of services (e.g., regular web page surfing, email, etc.). Thus, a PoP that is receiving the type of traffic with stricter requirements may not be identified as a PoP to which traffic is to be forwarded.

The flow of operations moves to operation 208. At operation 208, the server 112 determines the inter-PoP forwarding policies based on the identified PoPs. The inter-PoP forwarding policies enable load balancing of traffic between the PoPs of the cloud computing infrastructure 101. A forwarding policy for a PoP includes 1) an amount of traffic that needs to be forwarded from the PoP and 2) a destination network address of a PoP towards which traffic is to be forwarded. In some embodiments, the destination network address can be an external address (e.g., external IP address) of a compute server of the PoP, where the compute server hosts the cloud computing service. Alternatively or additionally, the destination network address can be an external address of a network device in the PoP that has other functionalities. For example, the network device can be a router or a forwarding unit in the PoP.

The flow of operations moves to operation 210. At operation 210, the server 112 transmits the forwarding policies 142 to one or more PoPs of the cloud computing infrastructure 101. For example, the server 112 transmits the forwarding policies to PoP 150A for forwarding traffic to PoP 150B. The configuration of the PoPs with the forwarding policies results in at least one PoP, e.g., PoP 150A, forwarding a portion of the traffic received according to the anycast protocol to another PoP, e.g., 150B. In some embodiments, the forwarding policies for a PoP may cause the PoP to forward traffic to multiple ones of the other PoPs in the cloud computing infrastructure 101.

The determination of the inter-PoP policies 142 is a dynamic mechanism that is performed periodically based on the feedback received for the compute servers of the PoPs. In some embodiments, changes to the forwarding policies can occur at a high frequency such as multiple times per hour. In some embodiments, the inter-PoP forwarding policy that is determined, can be a new inter-PoP forwarding policy (e.g., a policy to forward traffic from PoP 150A to PoP 150B), an update to an existing inter-PoP policy, or a cancellation of a previously existing inter-PoP forwarding policy. For example, when the central controller 114 determines that an existing inter-PoP forwarding policy is to be updated, it may transmit a request to modify the fraction of traffic that is forwarded for an established forwarding relationship.

Once the inter-PoP forwarding policies 142 are transmitted from the server 112 to the PoP(s) 150A-N, they are converted into forwarding table entries in the PoP(s). For example, a PoP management server 140A receives and stores the inter-PoP policies 142A. The inter-PoP forwarding policies 142A are converted into forwarding table entries 143A. In some embodiments, the forwarding table entries 143A are transmitted to one or more of compute servers 120A-P of the PoP 150A to be stored in forwarding tables of the compute servers. In some embodiments, different forwarding entries can be generated for different compute servers of the same PoP. For example, if the anycast address associated with a first compute server 120A is different from the anycast address associated with a second compute server 120B, different traffic will reach the different compute servers based on these two different anycast addresses. In this embodiment, different forwarding entries are populated for the different compute servers. In other embodiments, the same forwarding table entries are forwarded to multiple compute servers in a PoP.

In some embodiments, the generation of forwarding table entries for forwarding a flow of traffic to a remote PoP is dynamic. A forwarding policy is a forwarding relationship between a first PoP and a second PoP, where traffic is forwarded from the first PoP to the second PoP. When the amount of traffic associated with a forwarding relationship increases, an appropriate number of forwarding table entries is generated or updated to forward flows to the remote PoP. Alternatively, when the amount of traffic associated with the forwarding relationship is reduced, an appropriate number of forwarding table entries is updated for forwarding the flows to local compute servers of the PoP receiving the traffic instead of forwarding traffic to the remote PoP. Changes to the forwarding policy causes the update of forwarding table entries.

In some embodiments, the generation of forwarding table entries for forwarding traffic between PoPs ensures that traffic forwarded from a first PoP to a second PoP is not forwarded from the second PoP to a third PoP. Respecting this condition allows to avoid traffic looping from one PoP and back to itself via another PoP and avoids unnecessary latency that would be introduced by repeated forwarding of the same traffic to multiple PoPs.

Figure 2B:
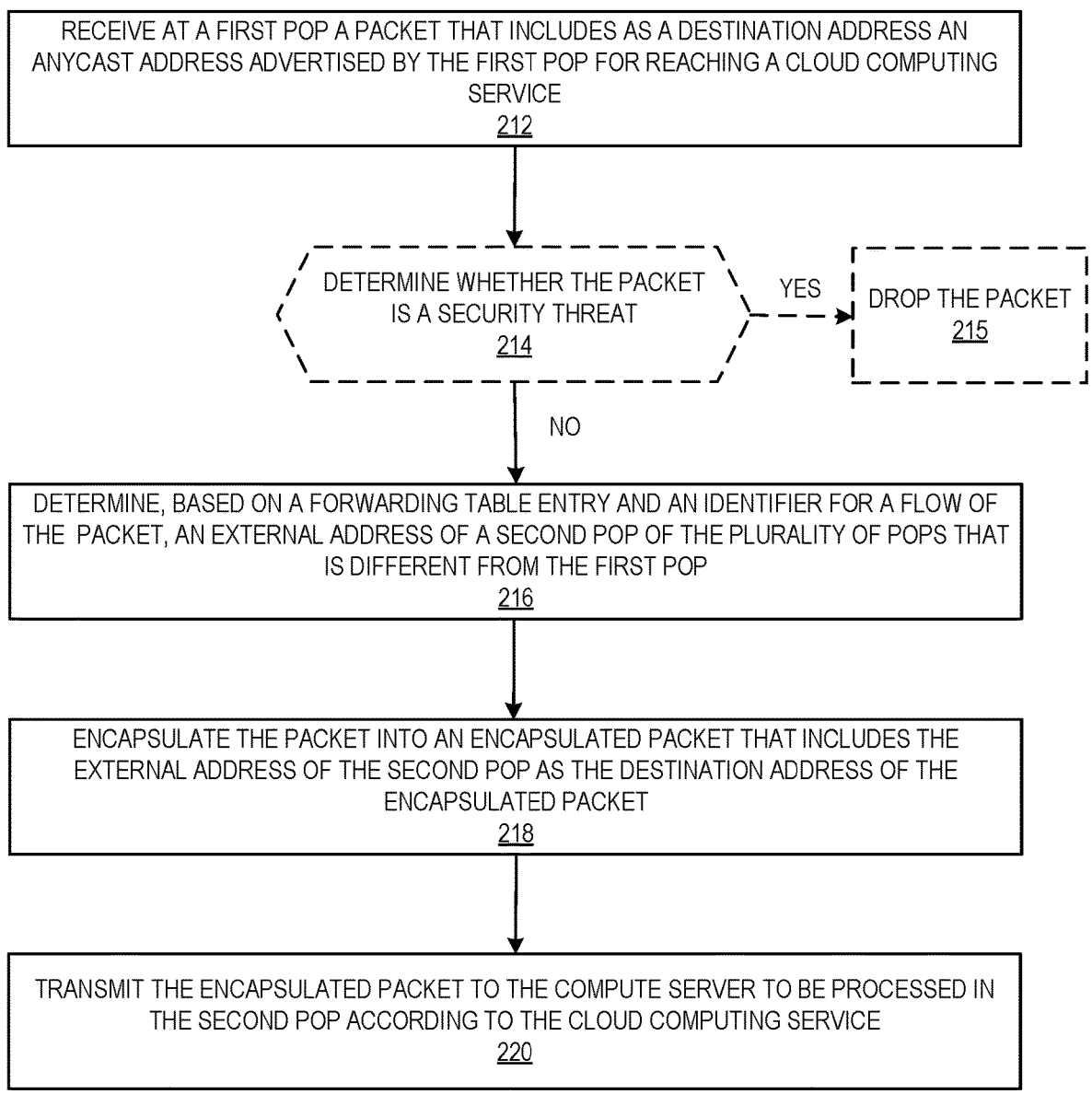
FIG. 2B illustrates a flow diagram of exemplary operations that can be performed for load balancing traffic across PoP(s) of a cloud computing infrastructure, in accordance with some embodiments.

FIG. 2B illustrates a flow diagram of exemplary operations that can be performed for load balancing traffic across PoP(s) of a cloud computing infrastructure, in accordance with some embodiments. The operation of FIG. 2B are performed in a first PoP of multiple PoPs of the cloud computing infrastructure. For example, the operations can be performed in PoP 150A. In some embodiments, the operations herein are performed in a forwarding unit 124A.

At operation 212, the PoP 150A receives a packet that includes as a destination address an anycast address advertised by the first PoP for reaching a cloud computing service. In some embodiments, the flow of operations moves to operation 214. In other embodiments, operation 214 is optional and the flow of operations moves to operation 216. At operation 214, the PoP 150A determines whether the packet is a security threat. For example, the PoP 150A may determine whether the packet is part of a volumetric attack (e.g., DDoS) on the PoP 150A. When it is determined that the packet is a security threat on the PoP 150A, the packet is dropped (operation 215). Alternatively, when it is determined that the packet is not a security threat on the PoP 150A, the flow of operations moves to operation 216.

At operation 216, the PoP 150A determines, based on a forwarding table entry and an identifier for a flow of the packet, a destination address of a second PoP of the plurality of PoPs that is different from the first PoP. The PoP 150A determines an identifier ID_1 of the packet 184A. The identifier ID_1 is used to access a forwarding table entry in the forwarding table 126A and determines based on the packet identifier a forwarding table entry that includes an IP address of the PoP 150B. The forwarding table entry further includes an inter-PoP indicator that indicates that the packet is to be forwarded to another PoP that is different from PoP 150A.

The flow of operations moves to operation 218. At operation 218, based on the inter-PoP indicator, the PoP 150A encapsulates the packet into an encapsulated packet that includes the external address of the second Pop as the destination address of the encapsulated packet. For example, the packet 184A is encapsulated according to an encapsulation protocol at the encapsulation unit 185A and the destination address retrieved from the forwarding table. The packet is encapsulated to include an encapsulation header. The encapsulation header includes the IP address of the first PoP 150A and a destination IP address of the second PoP 150B (e.g., external IP address of the compute server 120B, an external IP address of an edge network device in the PoP 150B, or a virtual IP address, etc.). In some embodiments, the encapsulation protocol can be GRE, GUE, or another encapsulation protocol.

The flow of operations moves to operation 220. At operation 220, the PoP 150A transmits the encapsulated packet to the second PoP instead of processing the packet locally according to the cloud computing service. The encapsulated packet 188 is transmitted to the PoP 150B through an encapsulation tunnel (e.g., GRE tunnel) over the network 105. The encapsulated traffic including the encapsulated packet 188 travels over the existing network 105. The destination address of an encapsulated packet is an external IP address of a network device in the PoP 150B.

Following the decapsulation of the packet at the POP 150B, the packet 184A is processed at the POP 150B as if it were received from the client device 110A. In some embodiments, the packet 184A is processed at the forwarding unit 124B prior to being transmitted to the compute server 120B for processing according to the cloud computing service. In other embodiments, the packet 184A is directly transmitted to the compute server 120B to be processed according to the cloud computing service. In some embodiments, the packet 184A is processed at the compute server 120B with zero or more other packets of the same flow to obtain the request for the second resource (e.g., one or more packets including the packet 184A can be processed at a network layer to obtain an application layer request (e.g., HTTP request) for the second request). The request for the second resource is processed by the service 123B. In some embodiments, when the request for the second network resource is processed, the request is fulfilled by retrieving the second network resource (from a cache or by transmitting a request to an origin server and receiving a response from the origin server). The compute server 120B transmits the second response to the client device 110A in one or more packets (IP packets).

Figure 2C:
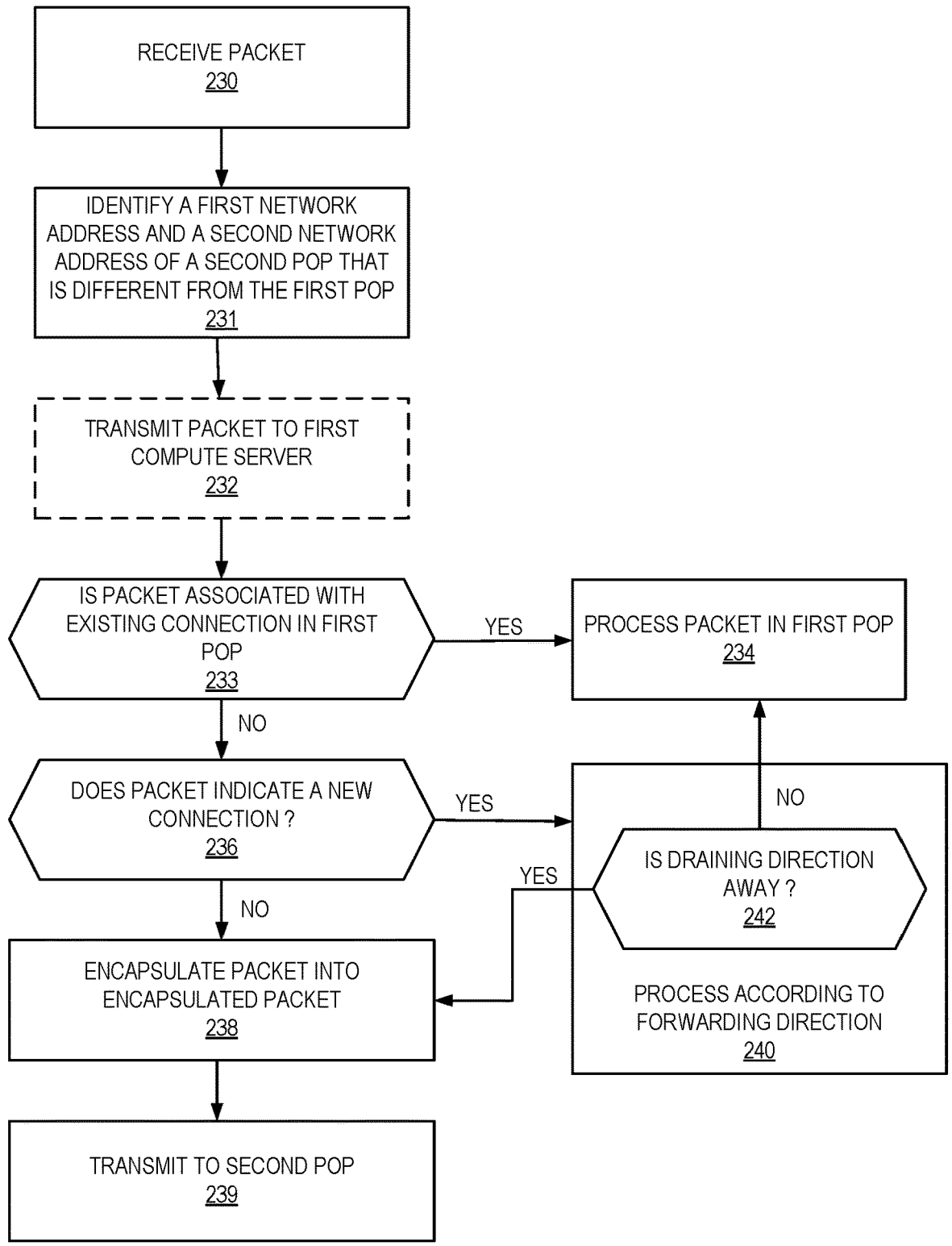
FIG. 2C illustrates a flow diagram of exemplary operations that can be performed for forwarding traffic from one PoP to another while maintaining existing connections.

FIG. 2C illustrates a flow diagram of exemplary operations that can be performed for forwarding traffic from one PoP to another PoP while maintaining existing connections. At operation 230, the PoP 150A receives a first packet. The first packet includes as a first destination address an anycast address advertised by the first PoP for reaching the cloud computing service. The first packet is received at the first PoP from multiple PoPs of the cloud computing infrastructure as a result of an anycast protocol. The flow of operations moves to operation 231. At operation 231, the PoP 150A identifies based on a first forwarding table entry and a first identifier for a first flow of the first packet, a first network address of the first PoP and a second network address of a second PoP that is different from the first PoP. The identification of the first network address and the second network address, includes a lookup of the first forwarding table entry in the forwarding table based on the first identifier of the first flow of the packet to retrieve the first network address and the second network address. The first network address is an external IP address of a first network device in the PoP. The first network device can be an edge network device that includes a router and/or a forwarding unit as described above. Additionally or Alternatively, the first network device can be a compute server. The second network address is an external IP address of a second network device in the PoP. The second network device can be an edge network device that includes a router and/or a forwarding unit as described above. Additionally or Alternatively, the second network device can be a compute server.

In some embodiments, the first packet is transmitted to a first compute server 120A of the first PoP 150A, at operation 232. Transmitting the first packet to the first compute server 120A includes encapsulating the first packet in an encapsulated packet and the second network address of the second PoP is included in a field of an encapsulated header of the encapsulated packet. In some embodiments, the encapsulation protocol can be GRE, GUE, or another encapsulation protocol. In other embodiments, the first packet is processed locally at the first PoP without the need for transmitting to another local compute server. The flow moves to operation 233. At operation 233, the PoP 150A determines whether a first connection is already established for the first flow locally. When the packet is transmitted to the first compute server 120A, the determination of whether a connection already exists for the packet is performed at the compute server 120A. For example, the PoP 150A may determine whether a TCP connection exists in a first compute server 120A for the flow of the packet that is received. In response to determining that a first connection is established at the first compute server for the first flow, the flow of operations moves to operation 234. At operation 234, the first packet is processed at the first PoP according to the cloud computing service.

Referring back to FIG. 2C, in response to determining that there is no connection established for the flow of the first packet in the first PoP, the flow of operations moves to operation 236. At operation 236, the PoP 150A determines whether the packet is an initial packet of a new connection for the first flow.

In response to determining that the first packet is not the initial packet of the new connection for the first flow, the flow of operations moves to operation 238. At operations 238, the PoP 150A transmits the packet to the second PoP to be processed in the second PoP according to the cloud computing service. Alternatively, in response to determining that the packet is the initial packet of the new connection for the flow, the flow of operations moves to operation 240. At operation 240, the first packet is processed according to a forwarding direction. In some embodiments, the PoP 150A further determines a forwarding direction from the forwarding table entry for the first packet. When accessing the forwarding table entry based on the first packet identifier, the PoP 150A further retrieves the forwarding direction for the packet. The forwarding direction can indicate that the packet is to be forwarded away (remote forwarding) from the PoP or back to the PoP (local forwarding). In other words, the forwarding direction indicates whether the packet is to be forwarded to another PoP or alternatively, whether the packet is to be processed locally at the PoP 150A.

In response to determining that the forwarding direction indicates a local forwarding, the flow of operations moves to operation 234. At operation 234, the first packet is processed at the first PoP, e.g., at the first compute server 120A according to the cloud computing service.

In response to determining that the forwarding direction indicates a remote forwarding, the flow of operations moves to operation 238. At operation 238, the packet is encapsulated to obtain an encapsulated packet. The packet is encapsulated to include an encapsulation header. The encapsulation header includes the IP address of the first PoP 150A and a destination IP address of the second PoP 150B (e.g., external IP address of the compute server 120B, an external IP address of an edge network device in the PoP 150B, or a virtual IP address, etc.). In some embodiments, the encapsulation protocol can be GRE, GUE, or another encapsulation protocol.

The flow of operations moves to operation 239. At operation 239, the packet is transmitted to the second PoP to be processed at the second PoP according to the cloud computing service. The encapsulated packet is transmitted to the PoP 150B through a tunnel (e.g., GRE tunnel) over the network 105. The encapsulated traffic including the encapsulated packet travels over the existing network 105.

Figure 2D:
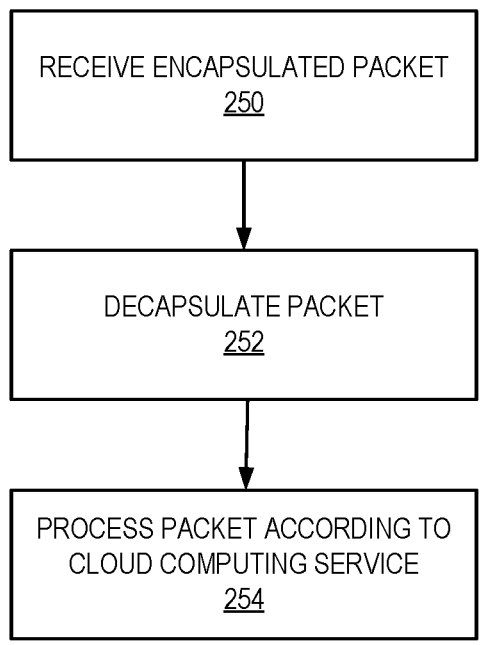
FIG. 2D illustrates a flow diagram of exemplary operations that can be performed when receiving a packet from another PoP, in accordance with some embodiments.

FIG. 2D illustrates a flow diagram of exemplary operations that can be performed when receiving a packet from another PoP, in accordance with some embodiments.

At operation 250 an encapsulated packet is received at the second PoP 150B. The packet is decapsulated according to the encapsulation protocol (e.g., GRE, GUE, or other) to retrieve the original packet, at operation 252. The flow moves to operation 254, at which the packet is processed according to the cloud computing service at the second PoP 150B. Thus, instead of being processed at the PoP that receives the packet based on the anycast protocol, the packet is forwarded to another PoP, the second PoP, and processed there consequently reducing the load on the first PoP. In some embodiments, upon receipt of the original packet, this packet can be processed as if it was directly received from a client device and can be subject to similar operations as described with reference to FIGS. 2B-C. In these embodiments, the packet may be forwarded to one or more other PoP prior to being processed at the application level.

Exemplary Electronic Devices

Electronic Device and Machine-Readable Media

One or more parts of the above embodiments may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 3:
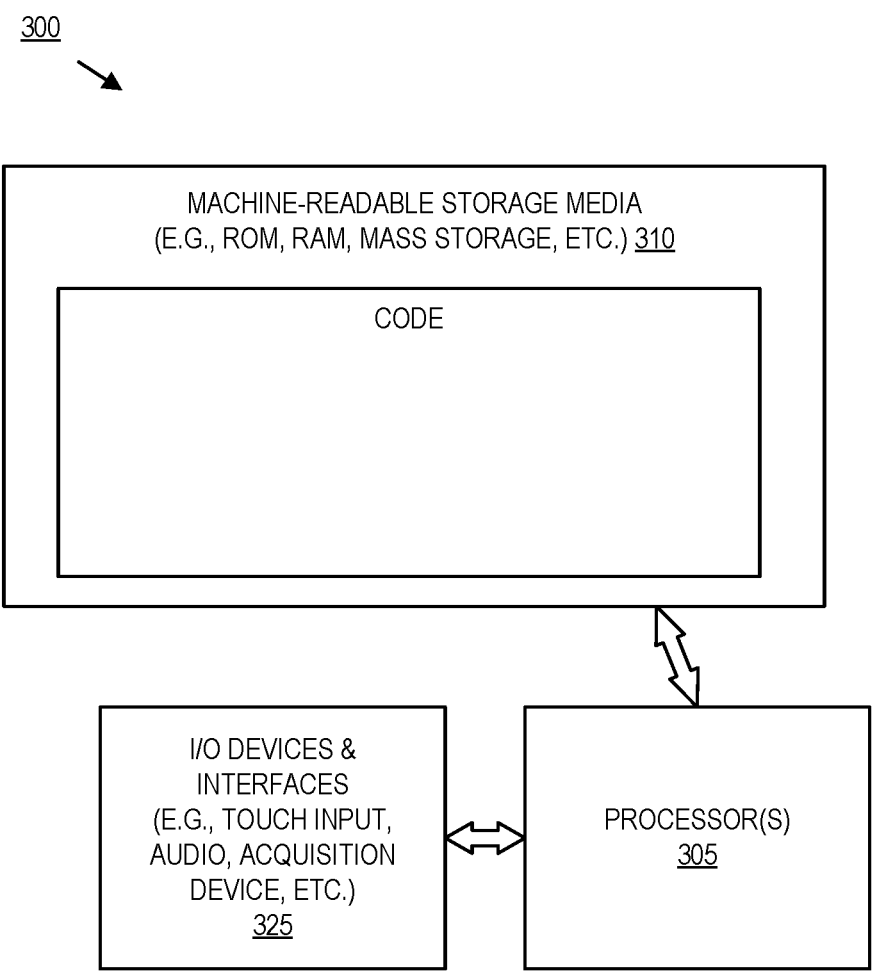
FIG. 3 illustrates a block diagram for an exemplary data processing system that may be used in some embodiments.

FIG. 3 illustrates a block diagram for an exemplary data processing system 300 that may be used in some embodiments. One or more such data processing systems 300 may be utilized to implement the embodiments and operations described with respect to the server 112, the routers, the forwarding units 124, the compute servers 120, the origin servers 130, and/or the client devices 110.

The data processing system 300 is an electronic device that stores and transmits (internally and/or with other electronic devices over a network) code (which is composed of software instructions and which is sometimes referred to as computer program code or a computer program) and/or data using machine-readable media (also called computer-readable media), such as machine-readable storage media 310 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processing system 320. The processing system 320 may be one or more processors and/or connected system components such as multiple connected chips. The depicted machine-readable storage media 310 may store program code 330 that, when executed by the processor(s) 320, causes the data processing system 300 to perform the operations described herein with reference to the block diagrams and the flow diagrams of FIGS. 1A-2D.

The data processing system 300 also includes one or more network interfaces 340 (e.g., a wired and/or wireless interfaces) that allows the data processing system 300 to transmit data and receive data from other computing devices, typically across one or more networks (e.g., Local Area Networks (LANs), the Internet, etc.). The data processing system 300 may also include one or more input or output ("I/O") components 350 such as a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. Additional components, not shown, may also be part of the system 300, and, in certain embodiments, fewer components than that shown may be part of the system 300.

While the flow diagrams in the figures show a particular order of operations performed by certain embodiments, it should be understood that such order is exemplary (e.g., alternative embodiments may perform the operations in a different order, combine certain operations, overlap certain operations, etc.).

While the above description includes several exemplary embodiments, those skilled in the art will recognize that the invention is not limited to the embodiments described and can be practiced with modification and alteration within the spirit and scope of the appended claims. The description is thus illustrative instead of limiting.

What is claimed is:

1. A method of load balancing traffic between a plurality of Points of Presence (PoPs) of a cloud computing infrastructure that provides a cloud computing service to one or more users, the method comprising:
receiving feedback data from the plurality of PoPs, the feedback data related to states of compute servers in the plurality of PoPs;
identifying, based on the feedback data, a first POP of the plurality of PoPs from which traffic needs to be forwarded to another POP;
identifying, based on the feedback data, a second POP of the plurality of PoPs towards which traffic can be forwarded from another POP;
determining an inter-POP forwarding policy defining an amount of first traffic received by the first POP to forward to the second POP;
transmitting the inter-POP forwarding policy to the plurality of PoPs;
receiving, at the first POP, the inter-PoP forwarding policy;
converting, at the first PoP, the inter-POP forwarding policy to forwarding table entries of a forwarding table used in the first POP, wherein each forwarding table entry includes a packet identifier that corresponds to a packet flow and a network address associated with the second POP, wherein the forwarding table entries are configured to direct a proportion of packet flows that align with the defined amount of traffic received by the first POP to be forwarded to the second POP;
receiving, at the first POP, a first packet;
determining a first packet identifier of the first packet that identifies a first packet flow;
determining, based on a first forwarding table entry of the forwarding table for the first packet identifier, a first network address associated with the second PoP; and
transmitting the first packet to the first network address associated with the second PoP.

2. The method of claim 1, wherein identifying, based on the feedback data, the first POP of the plurality of PoPs from which the traffic needs to be forwarded to another PoP comprises:
  determining that a CPU load of at least one compute server at the first POP exceeds a threshold value.

3. The method of claim 1, wherein identifying, based on the feedback data, the second POP of the of the plurality of PoPs towards which the traffic can be forwarded from another POP comprises:
  determining that a CPU load of one or more compute servers at the second PoP is lower than a threshold value.

4. The method of claim 1, wherein determining the inter-PoP forwarding policy defining the amount of the first traffic received by the first POP to forward to the second POP further comprises:
  specifying a first amount of the first traffic of a first traffic type to be forwarded from the first POP to the second POP, wherein the first traffic type is associated with a first cloud computing service provided by the cloud computing infrastructure; and
  specifying a second amount of the first traffic of a second traffic type to be forwarded from the first POP to the second POP, wherein the second traffic type is associated with a second cloud computing service provided by the cloud computing infrastructure.

5. The method of claim 4, further comprising:
  receiving updated feedback data from the plurality of PoPs; and
  modifying the specified first amount of the first traffic of the first traffic type to be forwarded from the first POP to the second POP and the specified second amount of the first traffic of the second traffic type to be forwarded from the first POP to the second PoP based on the updated feedback data.

6. The method of claim 1, further comprising:
  identifying, based on the feedback data, a third POP of the plurality of PoPs towards which traffic can be forwarded from another PoP;
  specifying a first amount of the first traffic of a first traffic type to be forwarded from the first POP to the second POP, wherein the first traffic type is associated with a first cloud computing service provided by the cloud computing infrastructure; and
  specifying a second amount of the first traffic of a second traffic type to be forwarded from the first POP to the third POP, wherein the second traffic type is associated with a second cloud computing service provided by the cloud computing infrastructure.

7. The method of claim 1, wherein the feedback data for a compute server in the plurality of PoPs includes one or more of a first parameter indicating a CPU load of the compute server, a second parameter measuring a Quality of Service provided by a service implemented on the compute server, and a measure of latency of the service.

8. A system, comprising:
  a first non-transitory machine-readable storage medium that provides instructions that, if executed by a first processor of a central controller of a cloud computing infrastructure that provides a cloud computing service to one or more users, will cause said central controller to perform operations including:
    receiving feedback data from a plurality of Point of Presences (PoPs) of the cloud computing infrastructure, the feedback data related to states of compute servers in the plurality of PoPs;
    identifying, based on the feedback data, a first POP of the plurality of PoPs from which traffic needs to be forwarded to another POP;
    identifying, based on the feedback data, a second POP of the plurality of PoPs towards which traffic can be forwarded from another POP;
    determining an inter-POP forwarding policy defining an amount of first traffic received by the first POP to forward to the second POP; and
    transmitting the inter-PoP forwarding policy to the plurality of PoPs;
  a second non-transitory machine-readable storage medium that provides instructions that, if executed by one or more second processors of the first PoP will cause operations to be performed including:
    receiving, at the first POP, the inter-POP forwarding policy;
    converting, at the first POP, the inter-PoP forwarding policy to forwarding table entries of a forwarding table used in the first POP, wherein each forwarding table entry includes a packet identifier that corresponds to a packet flow and a network address associated with the second POP, wherein the forwarding table entries are configured to direct a proportion of packet flows that align with the defined amount of traffic received by the first POP to be forwarded to the second PoP;
    receiving, at the first POP, a first packet;
    determining a first packet identifier of the first packet that identifies a first packet flow;
    determining, based on a first forwarding table entry of the forwarding table for the first packet identifier, a first network address associated with the second POP; and
    transmitting the first packet to the first network address associated with the second POP.

9. The system of claim 8, wherein identifying, based on the feedback data, the first POP of the plurality of PoPs from which the traffic needs to be forwarded to another POP further causes the central controller to perform operations including:
  determining that a CPU load of at least one compute server at the first POP exceeds a threshold value.

10. The system of claim 8, wherein identifying, based on the feedback data, the second POP of the plurality of PoPs towards which the traffic can be forwarded from another POP further causes the central controller to perform operations including:
  determining that a CPU load of one or more compute servers at the second POP is lower than a threshold value.

11. The system of claim 8, wherein determining the inter-POP forwarding policy defining the amount of the first traffic received by the first PoP to forward to the second POP further causes the central controller to perform operations including:
  specifying a first amount of the first traffic of a first traffic type to be forwarded from the first PoP to the second POP, wherein the first traffic type is associated with a first cloud computing service provided by the cloud computing infrastructure; and
  specifying a second amount of the first traffic of a second traffic type to be forwarded from the first POP to the second POP, wherein the second traffic type is associated with a second cloud computing service provided by the cloud computing infrastructure.

12. The system of claim 11, wherein the instructions further cause the central controller to perform operations including:
  receiving updated feedback data from the plurality of PoPs; and
  modifying the specified first amount of the first traffic of the first traffic type to be forwarded from the first POP to the second PoP and the specified second amount of the first traffic of the second traffic type to be forwarded from the first PoP to the second PoP based on the updated feedback data.

13. The system of claim 8, wherein the instructions further cause the central controller to perform operations including:
  identifying, based on the feedback data, a third POP of the plurality of PoPs towards which traffic can be forwarded from another POP;
  specifying a first amount of the first traffic of a first traffic type to be forwarded from the first PoP to the second POP, wherein the first traffic type is associated with a first cloud computing service provided by the cloud computing infrastructure; and
  specifying a second amount of the first traffic of a second traffic type to be forwarded from the first POP to the third POP, wherein the second traffic type is associated with a second cloud computing service provided by the cloud computing infrastructure.

14. The system of claim 8, wherein the feedback data for a compute server in the plurality of PoPs includes one or more of a first parameter indicating a CPU load of the compute server, a second parameter measuring a Quality of Service provided by a service implemented on the compute server, and a measure of latency of the service.

15. A system, comprising:
  a central controller of a cloud computing infrastructure that includes a first processor; and a non-transitory machine-readable storage medium that provides instructions that, if executed by the first processor, will cause the central controller to perform operations including:
    receiving feedback data from a plurality of Point of Presences (PoPs) of the cloud computing infrastructure, the feedback data related to states of compute servers in the plurality of PoPs;
    identifying, based on the feedback data, a first POP of the plurality of PoPs from which traffic needs to be forwarded to another PoP;
    identifying, based on the feedback data, a second POP of the plurality of PoPs towards which traffic can be forwarded from another POP;
    determining an inter-POP forwarding policy defining an amount of first traffic received by the first POP to forward to the second POP; and
    transmitting the inter-POP forwarding policy to the plurality of PoPs;
  the first POP that includes a plurality of compute servers that each include a second non-transitory machine readable storage medium that provides instructions that, if executed by one or more second processors of the first POP will cause operations to be performed including:
    receiving, at the first POP, the inter-PoP forwarding policy;
    converting, at the first POP, the inter-POP forwarding policy to forwarding table entries of a forwarding policy table used in the first POP, wherein each forwarding table entry includes a packet identifier that corresponds to a packet flow and a network address associated with the second PoP, wherein the forwarding table entries are configured to direct a proportion of packet flows that align with the defined amount of traffic received by the first POP to be forwarded to the second POP;
    receiving, at the first POP, a first packet;
    determining a first packet identifier of the first packet that identifies a first packet flow;
    determining, based on a first forwarding table entry of the forwarding table for the first packet identifier, a first network address associated with the second POP; and
    transmitting the first packet to the first network address associated with the second PoP.

16. The system of claim 15, wherein identifying, based on the feedback data, the first POP of the plurality of PoPs from which the traffic needs to be forwarded to another POP causes the central controller to perform operations comprising:
  determining that a CPU load of at least one compute server at the first POP exceeds a threshold value.

17. The system of claim 15, wherein identifying, based on the feedback data, the second POP of the plurality of PoPs towards which the traffic can be forwarded from another POP causes the central controller to perform operations comprising:
  determining that a CPU load of one or more compute servers at the second POP is lower than a threshold value.

18. The system of claim 15, wherein determining the inter-PoP forwarding policy defining the amount of the first traffic received by the first POP to forward to the second POP causes the central controller to perform operations comprising:
  specifying a first amount of the first traffic of a first traffic type to be forwarded from the first PoP to the second POP, wherein the first traffic type is associated with a first cloud computing service provided by the cloud computing infrastructure; and
  specifying a second amount of the first traffic of a second traffic type to be forwarded from the first POP to the second POP, wherein the second traffic type is associated with a second cloud computing service provided by the cloud computing infrastructure.

19. The system of claim 18, wherein the operations performed by the central controller further comprise:
  receiving updated feedback data from the plurality of PoPs; and
  modifying the specified first amount of the first traffic of the first traffic type to be forwarded from the first POP to the second POP and the specified second amount of the first traffic of the second traffic type to be forwarded from the first POP to the second PoP based on the updated feedback data.

20. The system of claim 15, wherein the operations performed by the central controller further comprise:
  identifying, based on the feedback data, a third POP of the plurality of PoPs towards which traffic can be forwarded from another POP;
  specifying a first amount of the first traffic of a first traffic type to be forwarded from the first PoP to the second POP, wherein the first traffic type is associated with a first cloud computing service provided by the cloud computing infrastructure; and
  specifying a second amount of the first traffic of a second traffic type to be forwarded from the first POP to the third POP, wherein the second traffic type is associated with a second cloud computing service provided by the cloud computing infrastructure.

21. The system of claim 15, wherein the feedback data for a compute server in the plurality of PoPs includes one or more of a first parameter indicating a CPU load of the compute server, a second parameter measuring a Quality of Service provided by a service implemented on the compute server, and a measure of latency of the service.

* * * * *